United States Patent
Drugeon et al.

(10) Patent No.: US 9,204,168 B2
(45) Date of Patent: Dec. 1, 2015

(54) IMAGE DECODING METHOD, IMAGE CODING METHOD, IMAGE DECODING APPARATUS, IMAGE CODING APPARATUS, AND IMAGE CODING AND DECODING APPARATUS

(75) Inventors: Virginie Drugeon, Darmstadt (DE); Matthias Narroschke, Schaafheim (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 647 days.

(21) Appl. No.: 13/491,019

(22) Filed: Jun. 7, 2012

(65) Prior Publication Data

US 2012/0320970 A1 Dec. 20, 2012

(30) Foreign Application Priority Data

Jun. 10, 2011 (EP) .................................... 11169587

(51) Int. Cl.
- *H04N 7/12* (2006.01)
- *G06K 9/18* (2006.01)
- *H04N 19/61* (2014.01)
- *H04N 19/563* (2014.01)
- *H04N 19/70* (2014.01)

(52) U.S. Cl.
CPC ............. *H04N 19/61* (2014.11); *H04N 19/563* (2014.11); *H04N 19/70* (2014.11)

(58) Field of Classification Search
CPC . H04N 7/50; H04N 7/26707; H04N 7/26946; H04N 7/26244; H04N 7/30; G06T 9/005
USPC .......................... 375/240.01–240.08, 240.25; 382/239–240, 233
See application file for complete search history.

(56) References Cited

U.S. PATENT DOCUMENTS

| | | | | |
|---|---|---|---|---|
| 8,885,725 B2 * | 11/2014 | Lee et al. | ................. | 375/240.16 |
| 9,025,891 B2 * | 5/2015 | Terada et al. | ................. | 382/232 |
| 2004/0252761 A1 * | 12/2004 | Brown et al. | ............ | 375/240.12 |
| 2011/0103701 A1 | 5/2011 | Cheon | | |
| 2012/0082216 A1 | 4/2012 | Wang et al. | | |
| 2012/0140831 A1 * | 6/2012 | Lee et al. | ................. | 375/240.24 |
| 2013/0272401 A1 * | 10/2013 | Seregin et al. | ........... | 375/240.12 |

(Continued)

FOREIGN PATENT DOCUMENTS

| JP | 5-41801 | 2/1993 |
|---|---|---|
| JP | 6-350996 | 12/1994 |
| KR | 1020110017720 | * 2/2011 |

OTHER PUBLICATIONS

European Search Report issued on Oct. 5, 2011 in corresponding European Patent Application No. 11169587.0.

(Continued)

*Primary Examiner* — Dave Czekaj
*Assistant Examiner* — Tsion B Owens
(74) *Attorney, Agent, or Firm* — Wenderoth, Lind & Ponack, L.L.P.

(57) ABSTRACT

An image decoding method according to an aspect of the present invention includes: extracting a size of an image from the bitstream; extracting a size of a smallest coding unit from the bitstream; judging whether or not the size of the image is an integral multiple of the size of the smallest coding unit; and decoding a coded image signal included in the bitstream, using the size of the image, when the size of the image is an integral multiple of the size of the smallest coding unit, to generate a first decoded image.

8 Claims, 25 Drawing Sheets

(56) References Cited

U.S. PATENT DOCUMENTS

2013/0315496 A1* 11/2013 Terada et al. ................ 382/243
2014/0146873 A1* 5/2014 Lee et al. ................ 375/240.02

OTHER PUBLICATIONS

ITU-T and ISO/IEC "Advanced video coding for generic audiovisual services", ITU-T recommendation H.264.

ISO/IEC 14496-10 "MPEG-4 Part10 Advanced Video Coding".

JCTVC-E603, for HEVC meeting No. 5 in Geneva from Mar. 16, 2011 to Mar. 23, 2011 http://phenix.int-evry.fr/jct/.

Bossen, F. et al., "HEVC Reference Software Manual", MPEG Meeting; Geneva, Mar. 15, 2011, XP030048588.

Jeon B. et al., "Description of video coding technology proposal by LG Electronics", JCT-VC Meeting; Dresden, Apr. 13, 2010, XP030007545.

Kadono et.al., "Kaitei San-pan H.264/AVC Kyokasho (Third Edition, H.264/AVC Textbook)" published by Impress R&D, First edition: published on Jan. 1, 2009, pp. 43, 94-96, 187, 326 and 327 and partial English translation.

Thomas Wiegand et al., WD3: Working Draft 3 of High-Efficiency Video Coding, Joint Collaborative Team on Video Coding (JCT-VC) of ITU-T SG16 WP3 and ISO/IEC JTC1/SC29/WG11 5$^{th}$ Meeting: Geneva, CH, Document JCTVC-E603 version 5, ITU-T, May 20, 2011, pp. 35, 59 and 60.

* cited by examiner

FIG. 20

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 31
| Corresponding standard | Driving frequency |
|---|---|
| MPEG-4 AVC | 500 MHz |
| MPEG-2 | 350 MHz |
| ⋮ | ⋮ |
FIG. 32A
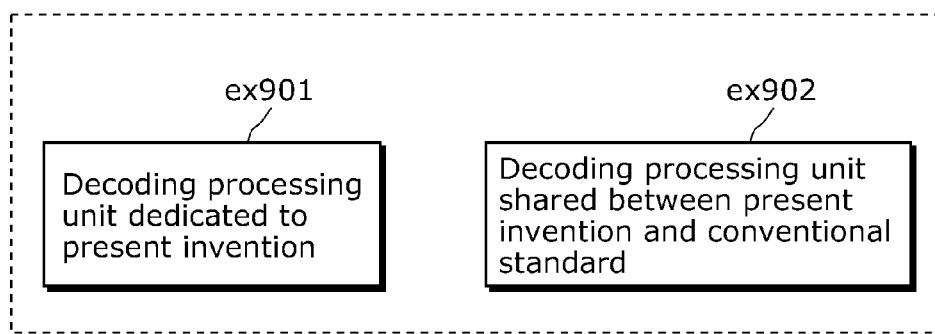
FIG. 32B
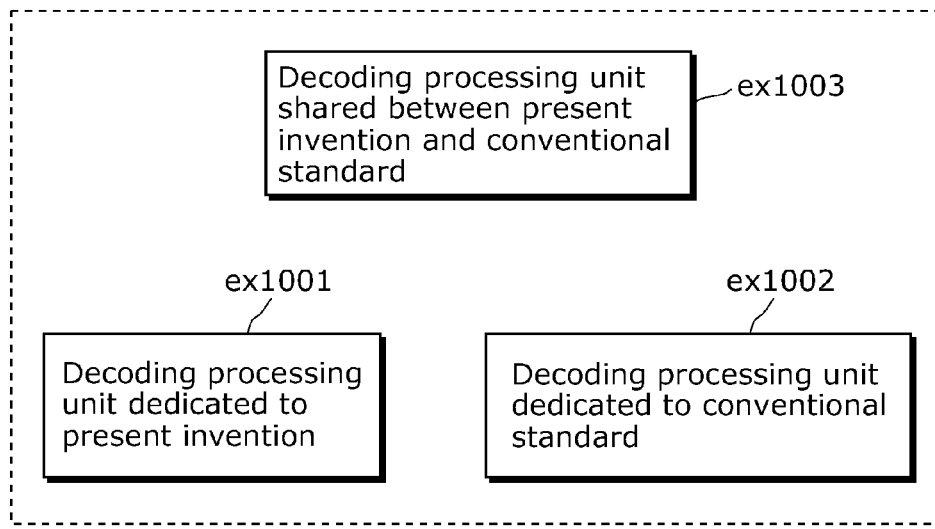

IMAGE DECODING METHOD, IMAGE CODING METHOD, IMAGE DECODING APPARATUS, IMAGE CODING APPARATUS, AND IMAGE CODING AND DECODING APPARATUS

CROSS REFERENCE TO RELATED APPLICATION

The present application claims the benefit of European Patent Application No. 11169587.0 filed on Jun. 10, 2011. The entire disclosure of the above-identified application, including the specification, drawings and claims is incorporated herein by reference in its entirety.

TECHNICAL FIELD

The present invention relates to an image decoding method, an image coding method, an image decoding apparatus, an image coding apparatus, and an image coding and decoding apparatus.

BACKGROUND ART

At present a majority of standardized video coding algorithms are based on hybrid video coding. Hybrid video coding methods typically combine several different reversible and irreversible compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. A new standard is currently being developed by Joint Collaborative Team on Video Coding (JCT-VC) under a name High-Efficiency Video Coding (HEVC), aiming, in particular, at improvements of efficiency regarding the high-resolution video coding.

A video signal input to an image coding apparatus is a sequence of images including frames. Each frame includes pixels arranged in a two-dimensional matrix. All the above-mentioned standards based on hybrid video coding include subdividing each frame into blocks (units) consisting of a plurality of pixels. The size of the blocks may vary, for instance, in accordance with the content of the image. The way of coding may be typically varied on a per block basis. The largest possible size for such a block varies depending on the standard. For instance in HEVC, the largest possible size is 64×64 pixels. In H.264/MPEG-4 AVC, a macroblock (usually denoting a block of 16×16 pixels) was the basic unit by which the coding is performed. Furthermore, the macroblock may be divided into smaller subblocks to which some of the coding/decoding processing were applied. In HEVC, the macroblock is the largest coding unit (LCU). However, the coding and decoding in HEVC may also be performed for smaller coding units, for instance, for blocks of 4×4, 8×8, 16×16 etc.

Typically, the coding processing of a hybrid video coding includes a spatial and/or a temporal prediction. Accordingly, each block to be coded is predicted using either spatially neighboring blocks or temporally neighboring blocks (blocks included in previously coded video frames). A block of differences between the block to be coded and its prediction value, also called prediction residual block, is then calculated. Furthermore, a residual block is transformed from the spatial (pixel) domain into a frequency domain. The transformation aims at reducing the correlation between the samples of the input block. Next, quantization is applied to the coefficients resulting from the transform. This quantization processing is an irreversible transformation. Subsequently, the transform coefficients obtained from the quantization are further compacted (reversibly compressed) by means of an entropy coding. In addition, information necessary for decoding of the coded video signal is also coded and transmitted together with the coded video signal. This information is for example information about the spatial and/or temporal prediction, the quantization, etc.

CITATION LIST

Non Patent Literature

[NPL 1] ITU-T and ISO/IEC "Advanced video coding for generic audiovisual services", ITU-T recommendation H.264

[NPL 2] ISO/IEC 14496-10 "MPEG-4 Part 10 Advanced Video Coding"

[NPL 3] JCTVC-E603, for HEVC meeting number 5 in Geneva from 16 Mar. 2011 to 23 Mar. 2011 http://phenix.int-evry.fr/jct/

SUMMARY OF INVENTION

Technical Problem

There is a demand for appropriately detecting that an error is included in the bitstream in which such a coded video signal is included.

In view of this, the present invention has as an object to provide an image decoding method and an image decoding apparatus that are capable of appropriately detecting an error in a bitstream.

Solution to Problem

In order to achieve the aforementioned object, an image decoding method according to an aspect of the present invention is an image decoding method for decoding a bitstream, the image decoding method including: extracting a size of an image from the bitstream; extracting a size of a smallest coding unit from the bitstream; judging whether or not the size of the image is an integral multiple of the size of the smallest coding unit; and decoding a coded image signal included in the bitstream, using the size of the image, when the size of the image is an integral multiple of the size of the smallest coding unit, to generate a first decoded image.

Advantageous Effects of Invention

The present invention can provide an image decoding method and an image decoding apparatus that are capable of appropriately detecting an error in a bitstream.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 20 is a diagram illustrating a structure of multiplexed data;

FIG. 31 is a diagram illustrating an example of a look-up table in which video data standards are associated with driving frequencies;

FIG. 32A is a diagram illustrating an example of a configuration for sharing a module of a signal processing unit;

FIG. 32B is a diagram illustrating another example of a configuration for sharing a module of the signal processing unit;

DESCRIPTION OF EMBODIMENTS

Underlying Knowledge Forming Basis of the Present Disclosure

The inventors have observed the occurrence of the following problems.

First, the basic configuration of an image coding apparatus and an image decoding apparatus according to Embodiment 1 of the present invention shall be described.

Figure 1:
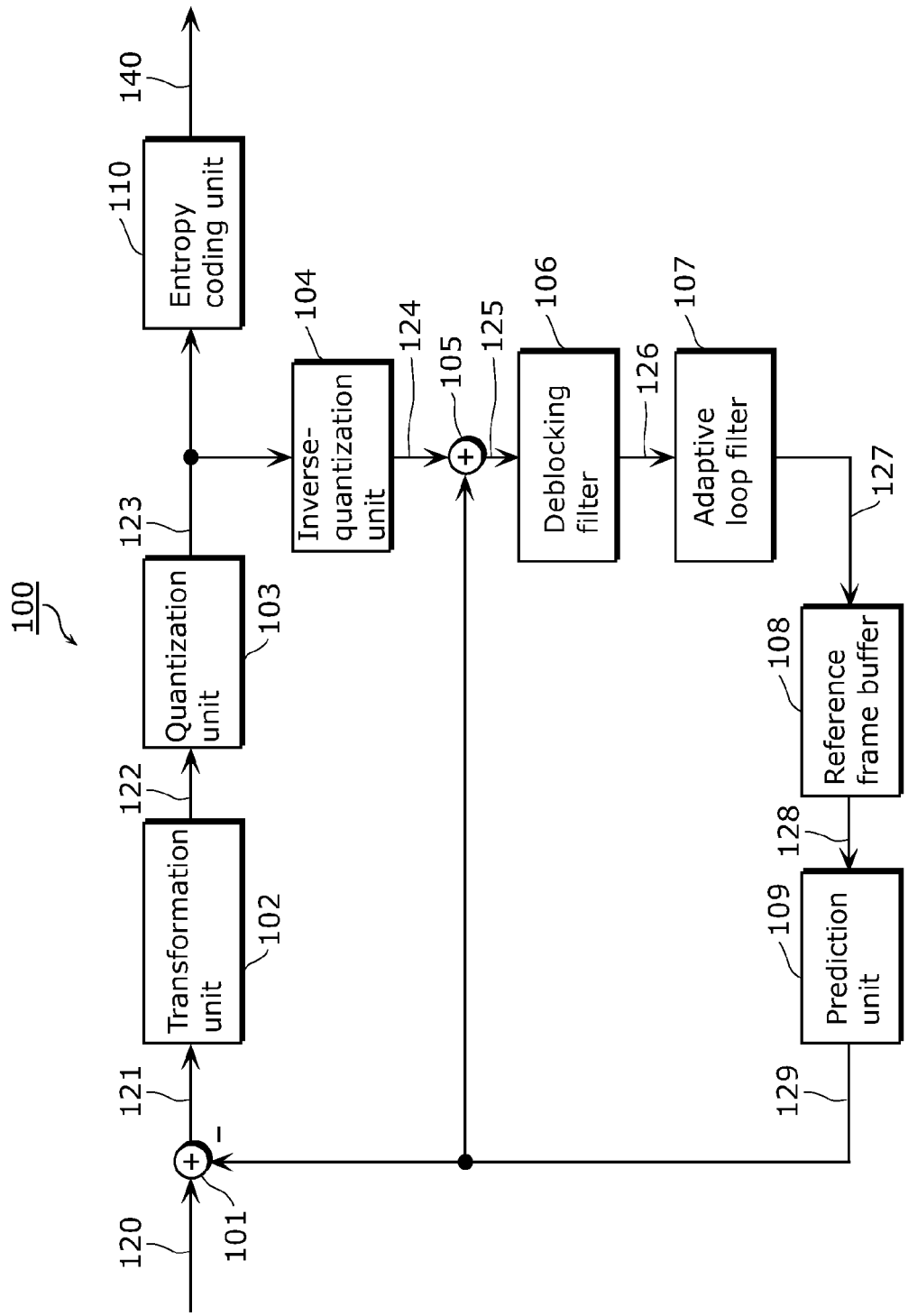
FIG. 1 is a block diagram of an image coding apparatus according to Embodiment 1 of the present invention.

FIG. 1 is a block diagram illustrating an example of a typical H.264/MPEG-4 AVC and/or HEVC image coding apparatus 100. The image coding apparatus 100 shown in FIG. 1 codes an input image signal 120 to generate a coded image signal 140. The image coding apparatus 100 includes a subtractor 101, a transformation unit 102, a quantization unit 103, a inverse-transformation unit 104, an adder 105, a deblocking filter 106, an adaptive loop filter 107, a reference frame buffer 108, and a prediction unit 109. It is to be noted that coding by the image coding apparatus 100 is performed in block-units.

The subtractor 101 calculates a residual signal 121 (prediction error signal) which is the difference between an input image signal 120 and a prediction image signal 129 of a current block to be coded. The residual signal 121 is used in the prediction of the current block. Furthermore, the prediction image signal 129 is generated by the prediction unit 109 described later. Here, the type of prediction can be varied on a per frame basis or on a per block basis. Blocks and/or frames predicted using temporal prediction are called "inter"-coded and blocks and/or frames predicted using spatial prediction are called "intra"-coded. The prediction image signal 129 obtained by using temporal prediction is derived from an image signal 128 stored in the reference frame buffer 108. The image signal 128 corresponds to a previously coded image signal. Furthermore, a prediction image signal obtained by using spatial prediction is derived from the values of pixels in the neighboring blocks, which have been previously coded, decoded, and then stored in the reference frame buffer 108.

The transformation unit 102 transforms the residual signal 121 to generate transform coefficients 122. The quantization unit 103 quantizes the transform coefficients 122 to generate quantized coefficients 123. The entropy coding unit 110 performs reversible entropy coding on the quantized coefficients 123 to generate a coded image signal 140, in order to further reduce the amount of data to be stored or transmitted. Entropy coding is mainly achieved by applying a code with code words of variable length. The length of a code word is selected based on the probability of its occurrence.

Furthermore, a decoding unit is incorporated in the image coding apparatus 100, for obtaining a decoded image signal 125 (reconstructed image signal).

The inverse-transformation unit 104 performs inverse-quantization and inverse-transform on the quantized coefficients 123 to reconstruct the residual signal 124. The residual signal 124 does not perfectly match the original residual signal 121 due to quantization error called quantization noise. The adder 105 adds the residual signal 124 to the prediction image signal 129 to generate a decoded image signal 125. In this manner, the image coding apparatus 100 decodes the coded signal using the same method as that used by the image decoding apparatus, and calculates the prediction image signal 129 based on the signal obtained through the decoding. Accordingly, compatibility between the image coding apparatus-side and the image decoding apparatus-side can be maintained.

Here, as a result of quantization, quantization noise is superposed to the decoded image signal 125. Furthermore, due to the block-wise coding, the superposed noise often has blocking characteristics. This results in visible block boundaries in the decoded image, particularly for strong quantization. Such blocking artifacts have a negative effect upon human visual perception. In order to reduce these artifacts, the deblocking filter 106 performs deblocking filtering on all blocks included in the decoded image. Deblocking filtering generally smoothes the block edges leading to an improved subjective quality of the decoded image. Moreover, since the filtered part of an image is used for the motion compensated prediction of subsequent images, the filtering also reduces the prediction errors, and thus enables improvement of coding efficiency.

The adaptive loop filter 107 performs adaptive loop filtering (ALF) on the deblocking-filtered image signal 126. The adaptive loop filtering is aimed at improving the pixel-wise fidelity ("objective" quality). In particular, adaptive loop filtering is used to compensate for image distortion caused by the compression. The adaptive loop filtering can be applied to the entire frame or to local areas (blocks). Furthermore, additional information indicating which areas are to be filtered is transmitted on a block basis, a frame basis, or a quadtree basis.

The reference frame buffer 108 stores the previously coded and subsequently decoded portions of an image (the image signal 127) in order for inter-coded blocks to be decoded.

The prediction unit 109 generates the prediction image signal 129 through inter prediction which employs motion compensated prediction. Specifically, first, a motion estimator finds a best-matching block for the current block within the previously coded and decoded frames. The best-matching block is used as the prediction image signal 129. Furthermore, the relative displacement (motion) between the current block and its best-match block is transmitted together with the decoded image data. Specifically, the displacement (motion) is transmitted as motion data including thee-component motion vectors. Here, the three components consist of two spatial components and one temporal component.

In order to optimize the prediction accuracy, motion vectors may be determined with a spatial sub-pixel resolution, for example, half pixel or quarter pixel resolution. A motion vector with spatial sub-pixel resolution may point to a spatial position within an already decoded frame where no real pixel value is available, that is, a sub-pixel position. Hence, spatial interpolation of such pixel values is needed in order to perform motion compensated prediction. This interpolation is achieved by an interpolation filter included in the prediction unit 109 for example.

For both the intra- and the inter-coding modes, the transformation unit 102 transforms the residual signal 121 which is the difference between the input image signal 120 and the prediction image signal 129 of the current block to generate the transform coefficients 122. The quantization unit 103 quantizes the transform coefficients 122 to generate the quantized coefficients 123. The transformation unit 102 uses an orthogonal transformation such as a two-dimensional discrete cosine transformation (DCT) or an integer version thereof. These transformations reduce the correlation of the natural video images efficiently. Here, lower frequency components are more important for image quality than high frequency components. Therefore, more bits are used in the coding of low frequency components than in the coding of high frequency components.

In the entropy coding unit 110, the two-dimensional matrix of the quantized coefficients 123 is converted into a one-dimensional array. Typically, this conversion is performed by what is called zig-zag scanning. Zig-zag scanning starts with the DC-coefficient in the upper left corner of the two-dimensional array and scans the two-dimensional array in a predetermined sequence ending with the AC coefficient in the lower right corner. As the energy is concentrated in the left upper part of the two-dimensional matrix of coefficients, corresponding to the lower frequencies, the zig-zag scanning results in an array where usually the last values are zero. This allows for efficient encoding using run-length codes as a part of or a pre-processing to the entropy coding.

Next, the configuration of the image coding apparatus according to this embodiment shall be described.

Figure 2:
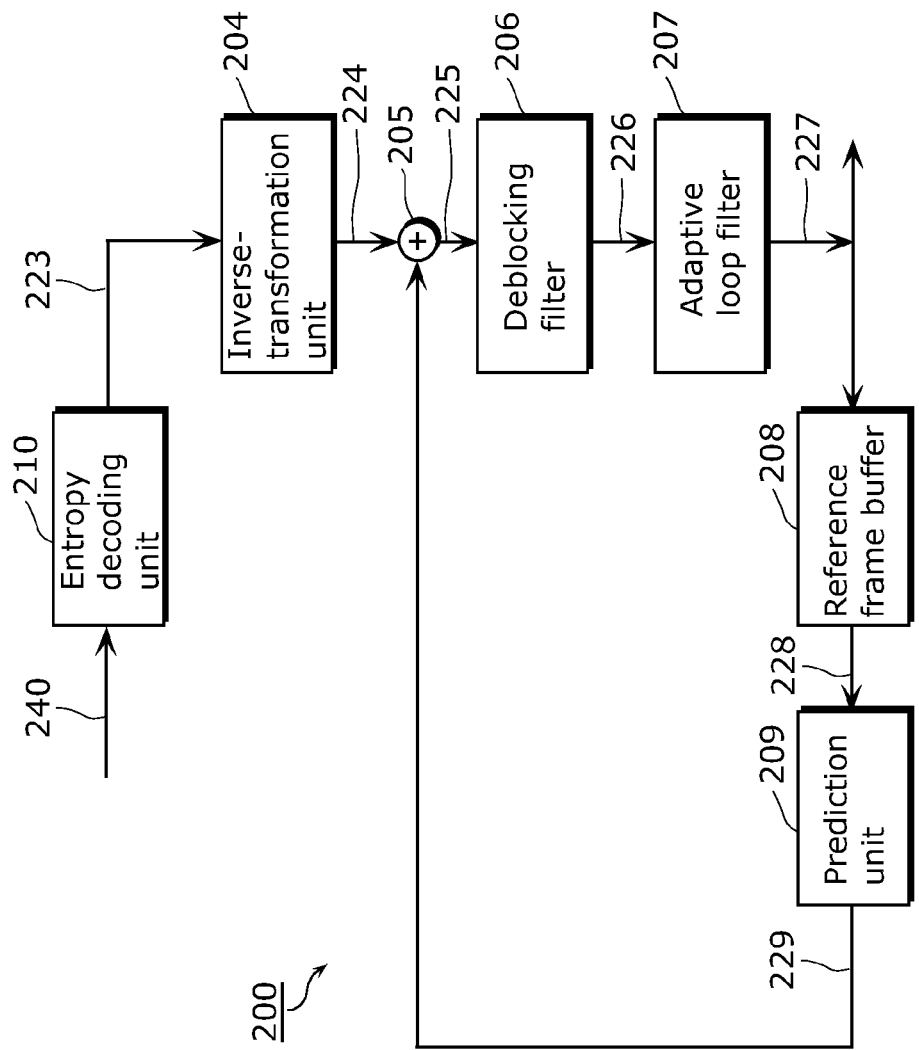
FIG. 2 is a block diagram of an image decoding apparatus according to Embodiment 1 of the present invention.

FIG. is a block diagram illustrating an image decoding apparatus 200 according to the H.264/MPEG-4 AVC or HEVC video coding standard. The image decoding apparatus 200 shown in FIG. 2 decodes a coded image signal 240 to generate an image signal 227. The image decoding apparatus 200 includes an entropy decoding unit 210, an inverse-transformation unit 204, an adder 205, a deblocking filter 206, an adaptive loop filter 207, a reference frame buffer 208, and a prediction unit 209.

The coded image signal 240 is input to the entropy decoding unit 210. The entropy decoding unit 210 decodes the coded image signal 240 to generate quantized coefficients 223 and information necessary for decoding such as motion data, prediction mode, etc. The quantized coefficients 223 are inversely scanned in order to obtain a two-dimensional matrix, which is then sent to the inverse-transformation unit 204.

The inverse-transformation unit 204 inverse-transforms and inverse-quantizes the quantized coefficients 223 to generate a residual signal 224. The residual signal 224 corresponds to the differences obtained by subtracting the prediction image signal from the image signal input to the image coding apparatus in the case where it is assumed that no quantization noise is introduced and no error occurred.

A prediction image signal 229 is obtained from either a temporal or a spatial prediction. Furthermore, the decoded information usually further include the information necessary for the prediction such as prediction type in the case of intra-prediction and motion data in the case of motion compensated prediction.

The adder 205 calculates the decoded image signal 225 by adding the residual signal 224 in the spatial domain to the prediction image signal 229. The deblocking filter 206 performs deblocking filtering on the decoded image signal 225 to generate an image signal 226. The adaptive loop filter 207 performs adaptive loop filtering on the image signal 226 to generate an image signal 227. The reference frame buffer 208 stores the image signal 227 as an image signal 228.

Here, standardized hybrid video coding, e.g. H.264/MPEG-4 AVC or HEVC, are used to code image signals having more than one color component (like YUV, YCbCr, RGB, RGBA, etc). For the purpose of prediction, the current image to be coded is divided into blocks. Furthermore, it is possible to use blocks of different sizes. Then information indicating the block size used is coded and transmitted. Furthermore, standardized image coding apparatuses typically use rectangular blocks with a minimum block size, e.g. of 4×4 samples.

The H.264/MPEG-4 AVC as well as the HEVC standards include two functional layers, a Video Coding Layer (VCL) and a Network Abstraction Layer (NAL). The VCL provides the coding functionality as described above.

The Network Abstraction Layer encapsulates syntax elements into standardized units called NAL units according to their further application such as transmission of data over a channel or storing of data in a storage device. The syntax elements are, for instance, the encoded prediction error signal or other information necessary for the decoding of the image signal such as prediction type, quantization parameter, motion vectors, etc. In such standards, VCL NAL units containing the compressed image data and the related information are used. Furthermore, in these standards, non-VCL units encapsulating additional data which are parameter sets relating to an entire video sequence or to a part thereof are used. Furthermore, in these standards, Supplemental Enhancement Information (SEI) providing additional information that can be used to improve the decoding accuracy is used. Other non-VCL NAL units are, for instance picture parameter set (PPS) and sequence parameter set (SPS) as described in NPL 1 and NPL 2, sections 7.3.2.1 and 7.3.2.2, and in NPL 3, sections 7.3.2.1 and 7.3.2.2.

The picture parameter set includes information related to a picture. The sequence parameter set includes information related to the video sequence. For instance, the sequence parameter set includes information about the size of the pictures included in the video sequence. In H.264/MPEG4 AVC, the vertical and horizontal size of the pictures is transmitted in number of macroblocks (blocks of 16×16 pixels). Therefore, the internal size of the pictures needs to be a multiple of the macroblock size.

Furthermore, when the original image has a resolution that is not a multiple of 16×16, the image coding apparatus pads a portion of the buffer in order to obtain an image size that is a multiple of 16×16. In addition, cropping data is embedded into the sequence parameter set in order to convey by signal which part of the pictures is relevant, that is, which part corresponds to the signal of the original image input from the image coding apparatus. Compared to H.264/MPEG4 AVC, HEVC conveys the picture size using a signal indicating the number of luminance samples, thus signaling for any possible size of original image is possible. However, the coding still remains block-wise with blocks (units) of possibly variable sizes. Therefore, the internal size of the pictures in the image coding apparatus and image decoding apparatus has to be an integral multiple of the coding block size.

Meanwhile, there is a demand for appropriately detecting that an error is included in a bitstream. For example, because an error is included in the bitstream, there is a possibility for the occurrence of a case where the internal size of a picture indicated by information included in the bitstream is not an integral multiple of the coding block size. The inventors found that such cases have the problem that there is a possibility that decoding cannot be performed correctly in the image decoding apparatus. Furthermore, in the worst case, there is a possibility that the coding will stop.

In view of this, the present embodiment provides an image decoding method and an image decoding apparatus that are capable of appropriately detecting an error in a bitstream.

In order to solve the aforementioned problems, an image decoding method according to an aspect of the present invention is an image decoding method for decoding a bitstream, the image decoding method including: extracting a size of an image from the bitstream; extracting a size of a smallest coding unit from the bitstream; judging whether or not the size of the image is an integral multiple of the size of the smallest coding unit; and decoding a coded image signal included in the bitstream, using the size of the image, when the size of the image is an integral multiple of the size of the smallest coding unit, to generate a first decoded image.

Accordingly, with the image decoding method according to an aspect of the present invention, an error in a bitstream can be appropriately detected.

Furthermore, the image decoding method may further include determining that an error is included in the bitstream when the size of the image is not an integral multiple of the size of the smallest coding unit.

Furthermore, the determining may include decoding the coded image signal included in the bitstream, using an assumed size of the image, to generate a second decoded image, the assumed size being obtained under an assumption that a correct size of the image is an integral multiple of the size of the smallest coding unit.

Accordingly, with the image decoding method according to an aspect of the present invention, an image having the size of the original image can be generated from the padded image, using the information included in the bitstream.

Furthermore, the determining may include: calculating the number of padding rows or the number of padding columns, based on a difference between the extracted size of the image and the assumed size of the image; and cropping, from the second decoded image, an image having the number of the padding rows or the number of the padding columns.

Accordingly, with the image decoding method according to an aspect of the present invention, a decoded image can be generated even when an error occurs in the bitstream.

Furthermore, the image decoding method may further include extracting padding direction information from the bitstream, the padding direction information indicating one of top, bottom, left, and right sides of the image, wherein, in the cropping, the image having the number of the padding rows or the number of the padding columns may be cropped from the second decoded image at any one of the top, bottom, left, and right sides indicated by the padding direction information.

Accordingly, with the image decoding method according to an aspect of the present invention, an image having the size of the original image can be generated from the padded image, using the information included in the bitstream.

Furthermore, in the extracting of padding direction information, the padding direction information may be extracted from a picture-specific parameter set or a sequence-specific parameter set which are included in the bitstream.

Furthermore, an image coding method according to an aspect of the present invention may be an image coding method for coding an image signal, the image coding method may include: calculating, as a size of an image, a number of pixels which is an integral multiple of a size of a smallest coding unit; and generating a bitstream including the size of the smallest coding unit and the number of pixels.

Accordingly, with the image coding method according to an aspect of the present invention, it is possible to generate a bitstream that allows appropriate detection of an error at the image decoding apparatus.

Furthermore, an image decoding apparatus according to an aspect of the present invention may be an image decoding apparatus that decodes a bitstream, the image decoding apparatus may include: a parsing unit configured to extract, from the bitstream, a size of an image and a size of a smallest coding unit; a judgment unit configured to judge whether or not the size of the image is an integral multiple of the size of the smallest coding unit; and an image decoding unit configured to decode a coded image signal included in the bitstream, using the size of the image, when the size of the image is an integral multiple of the size of the smallest coding unit, to generate a first decoded image.

Accordingly, the image decoding apparatus according to an aspect of the present invention is capable of appropriately detecting an error in the bitstream.

Furthermore, an image coding apparatus according to an aspect of the present invention may be an image coding apparatus that codes an image signal, the image coding apparatus may include: an image size calculation unit configured to calculate, as a size of an image, the number of pixels which is an integral multiple of a size of a smallest coding unit; and a bitstream generation unit configured to generate a bitstream including the size of the smallest coding unit and the number of pixels.

Accordingly, the image coding apparatus according to an aspect of the present invention is capable of generating a bitstream that allows appropriate detection of an error at the image decoding apparatus.

Furthermore, an image coding and decoding apparatus according to an aspect of the present invention may include the image coding apparatus and the image decoding apparatus.

It should be noted that these general and specific aspects may be implemented using a system, a method, an integrated circuit, a computer program, or a non-transitory computer-readable recording medium, or any combination of systems, methods, integrated circuits, computer programs, or non-transitory computer-readable recording media.

Hereinafter, an image decoding apparatus and an image coding apparatus according to an aspect of the present invention shall be described with reference to the drawings.

It is to be noted that the embodiments described below shows a specific example of the present invention. The numerical values, shapes, materials, structural elements, the arrangement and connection of the structural elements, steps, the processing order of the steps etc. shown in the following exemplary embodiments are mere examples. Therefore, among the structural elements in the following exemplary embodiments, structural elements not recited in any one of the independent claims defining the most generic part of the inventive concept are described as arbitrary structural elements.

Embodiment 1

Hereinafter, an image coding apparatus and an image decoding apparatus according to Embodiment 1 of the present invention shall be described.

The size of the images of the video sequence to be coded is set at the image coding apparatus. The image size is then typically embedded into the bitstream containing coded image data. The bitstream has a predefined format for embedding the information so that the information can be understood in the same way at the image coding apparatus and the image decoding apparatus. The image decoding apparatus decodes the coded images from the bitstream accordingly. For instance, in H.264/MPEG-4 AVC, the size of the images is included in a non-VCL NAL unit including a sequence parameter set (SPS). The sequence parameter set is typically provided at the beginning of the bitstream. There can be several sequence parameter sets provided per coded video sequence but only one sequence parameter set is typically active for an entire coded video sequence. In H.264/MPEG-4 AVC, a coded video sequence is defined to begin at each IDR picture (see NPL 2 Section 7.4.1.2.1).

The size of an image (a still image or a frame included in a video sequence) is typically defined by means of a vertical size and a horizontal size of the image. The vertical size and the horizontal size of the image may be expressed in different units. For instance, H.264/MPEG-4 AVC indicates the size of the pictures in terms of the number of macroblocks, that is, in units of size 16×16. Before coding, the picture is typically partitioned into blocks of fixed sizes, thus forcing the internal size of the pictures (the image size to be used in coding inside the apparatus) to be a multiple of the coding block size. When an original image (the original image input to the image coding apparatus) has a size which is not an integral multiple of the predefined coding unit (such as macroblock), the internal size of the pictures inside the image coding apparatus is different from the size of the original image. In this case, the image decoding apparatus renders the image in the size corresponding to the original image coded at the image coding apparatus side rather than in the internal size. Therefore, also at the image decoding apparatus, the internal size may differ from the size of the decoded picture to be output (displayed).

In order to keep the original image size flexible and compatible at both the image coding apparatus and the image decoding apparatus, cropping data is included within the bitstream. The cropping data is for specifying which part of the picture is relevant, i.e., which part of the picture corresponds to the original image. The cropping data is indicated by means of the number of rows to be padded (added) to a bottom or a top side of the picture or by means of the number of columns to be padded to a right or a left side of the picture. Here, the rows and columns refer respectively to rows and columns of pixels that are arranged two-dimensionally.

The HEVC standard is not limited to macroblock as a coding unit. The pictures are partitioned into largest coding units (LCU), which are further recursively partitioned into smaller coding units (CUs). The coding units in HEVC have sizes corresponding to an integer power of two (such as 128, 64, 32, 16, or 8). The size of the smallest allowable coding unit for a given coded sequence is sent in the sequence parameter set. Furthermore, the internal size of the pictures is constrained to be always a multiple of the smallest coding unit (SCU) size.

In addition, HEVC does not signal the size of the image in number of blocks. The picture size is signaled in number of luminance samples. This is because the chrominance components may be sub-sampled, as for instance in the case of YUV format 4:2:2 or 4:2:0. Furthermore, some image sizes are not allowed. In addition, the number of padding pixels at the bottom and at the right border of the pictures is indicated This embodiment provides a more efficient way of indicating in the bitstream information that is necessary to determine both the internal size of the image and the original image size. This corresponds to determining of the internal size of the image and the original image size.

Furthermore, this embodiment is based on the observation that it is redundant to indicate in the bit-stream a picture size in terms of the number of luminance samples and the number of padding pixels. Specifically, the size of the pictures (original image size) is signaled in number of luminance samples (pixels). This original image size is not necessarily a multiple of the smallest coding unit size. Furthermore, the information about the original image size is also transmitted within the syntax of the bitstream.

After reading the size of the smallest CU (coding unit), the image decoding apparatus automatically calculates, in the same way as at the image coding apparatus, the number of padding pixels necessary in order to have an internal size that is a multiple of the signaled smallest CU size. Thus, no additional padding information needs to be embedded into the bitstream in order to unambiguously determine the size of the picture. Specifically, in the image coding apparatus and the image decoding apparatus, it is assumed that the number of padding columns or rows of pixels is not higher than the smallest coding unit size. In other words, in the image coding apparatus and the image decoding apparatus, it is judged that only the minimum number of pixels necessary to obtain an internal size that is a multiple of the smallest CU size is padded.

Figure 3:
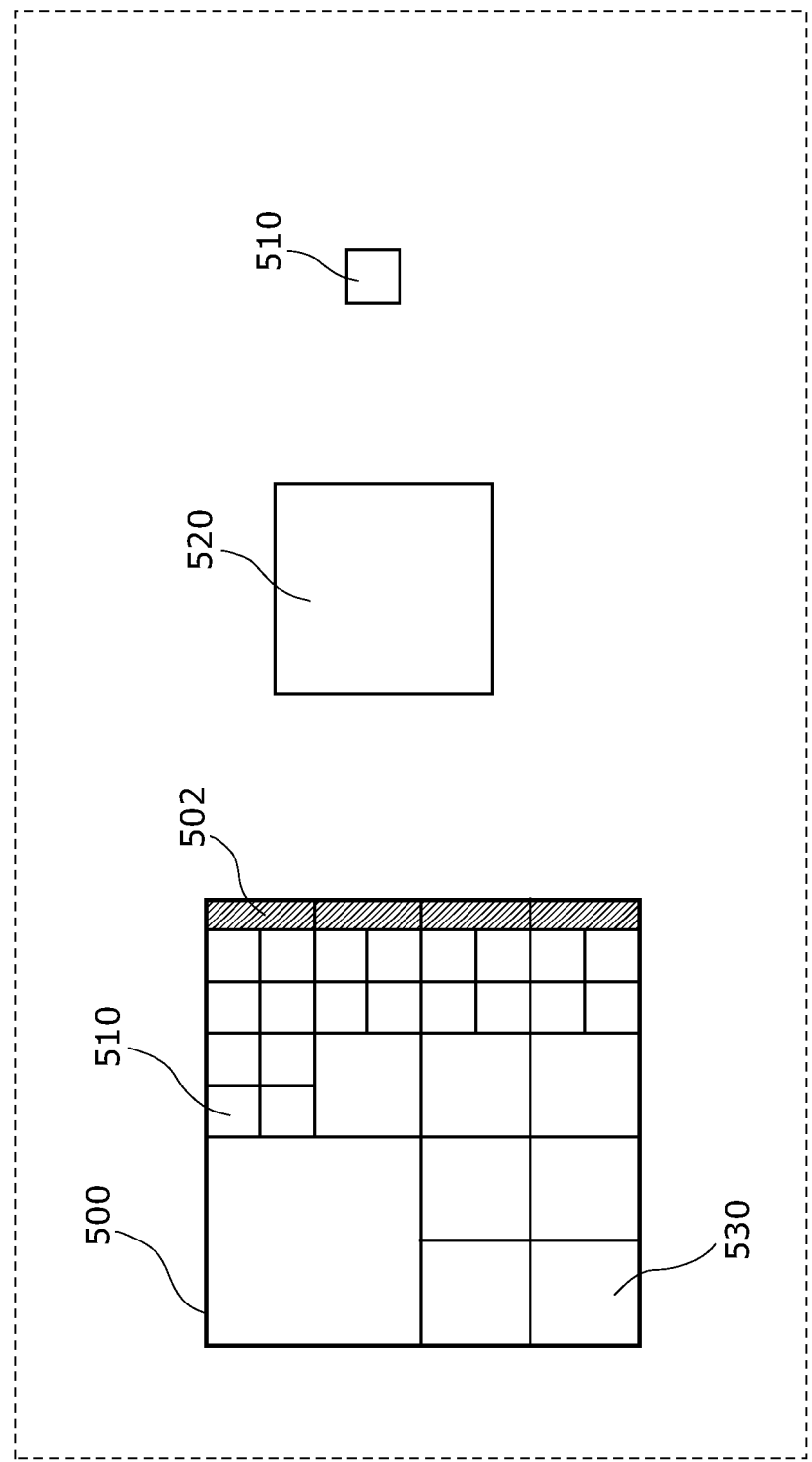
FIG. 3 is a diagram illustrating an example of blocks included in a picture according to Embodiment 1 of the present invention.

FIG. 3 illustrates the necessity of padding pixels on an example original image 500. Furthermore, FIG. 3 shows an example of relative sizes of the original image 500, a smallest coding unit 510, and the largest coding unit 520. The original image 500 is subdivided into coding units of different sizes such as the smallest coding unit 510, a coding unit 530 larger than the smallest coding unit 510 but smaller than the largest coding unit 520, etc. Any coding sizes from the range between and including the smallest coding unit 510 and the largest coding unit 520 are possible.

Information indicating the smallest coding unit 510 and the largest coding unit 520 to be used for the pictures of one coded sequence are included in the sequence parameter set (SPS). In the case of HEVC, only coding sizes that are an integer power of two between 8 and 128 are allowed. Specifically, the smallest CU size and the largest CU size signaled in the sequence parameter set must belong to that range.

However, using coding units of different sizes or shapes may be allowed in other codecs for which the present invention may also be applicable. Moreover, in HEVC, a coding unit of any size must be square-shaped. Furthermore, automatic splitting of coding units into smaller coding units may be used at pictures boundaries. Furthermore, a coding unit may only be split if its size is bigger than the smallest CU size. As can be seen from FIG. 3, without padding the original image 500, after dividing it into coding units, the columns of pixels on the right-side border (image region 502) still remain without being included in the coding units. The horizontal size of the image region 502 is smaller than the horizontal size of the smallest CU size. Therefore, the image region 502 cannot be coded.

Current syntax of a sequence parameter set in HEVC (see NPL 3 Sections 7.3.2.1 and 7.3.2.2) includes, as the picture size, a picture width and picture height defined by the number of luminance samples. Moreover, in such syntax, the smallest CU size is indicated as a value of a base-2 logarithm of the smallest CU size minus three. For instance, when the smallest CU size is 8×8, "0" is signaled as information indicating the smallest CU size; when the smallest CU size is 16×16, "1" is signaled as information indicating the smallest CU size; when the smallest CU size is 32×32, "2" is signaled as information indicating the smallest CU size, etc.

In current design, the internal size of the pictures in the image coding apparatus and image decoding apparatus must be a multiple of the smallest coding unit size. The current test software (HEVC test Model (HM) version 3.0, available at http://hevc.kw.bbc.co.uk/svn/jctvc-hm) signals padding information that indicates in number of pixels the padding region at the right and bottom boundaries of the image.

In this embodiment, the size of the original image and the smallest CU size are indicated in the bitstream and based on this information, the image decoding apparatus determines the number of padding rows or columns in the same way as that at the image coding apparatus. Therefore, there is no need to send any additional information, such as the number of padding rows or columns, from the image coding apparatus to the image decoding apparatus. In this manner, this embodiment can provide an effective way for determining the internal size of an image and the size of the original image, in both the image coding apparatus and the image decoding apparatus.

Figure 4:
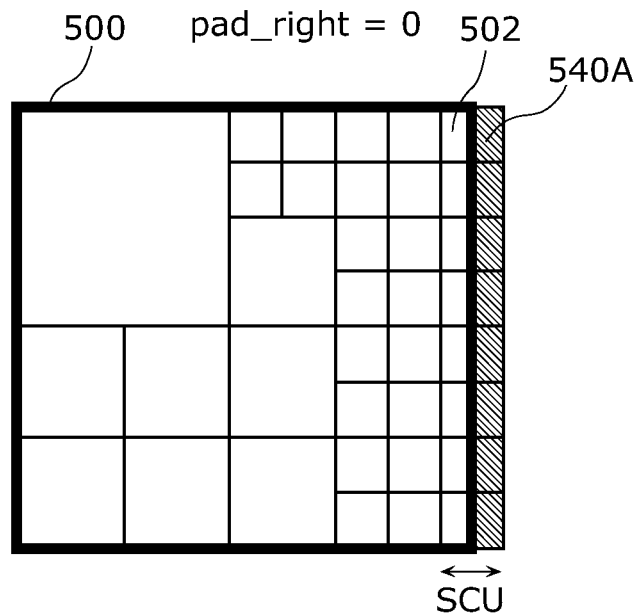
FIG. 4 is a diagram illustrating an example of padding according to Embodiment 1 of the present invention.

FIG. 4 shows the original image 500 subdivided into coding units of different sizes similar to that in FIG. 3. As can be seen from FIG. 4, at the right picture boundary there is the image region 502 which is part of the original image 500 and is located in the right-side boundary. The width of the image region 502 is smaller than the width of the smallest coding unit. The image coding apparatus pads the original image 500 with the padding pixel region 540A (padding pixel column). The image coding apparatus calculates the number of padding pixel columns of the padding region 540A in such a way that the sum of the number of columns of the image region 502 and the number of columns of the padding region 540A equals the horizontal size of the smallest coding unit. Specifically, the image coding apparatus calculates the number of pixel columns of the padding region 540A by subtracting, from the horizontal size of the smallest coding unit size, the remainder after an integer division of the horizontal size of the original image and horizontal size of the smallest coding unit size. Specifically, the number of columns N of the padding region 540A is shown in (Equation 1) below.

[Math. 1]

$$N = s - (w \% s) \qquad \text{(Equation 1)}$$

Here, s is the horizontal size of the smallest coding unit, w is the width of the original image, and % is the modulo operation.

In this manner, the embodiment does not require any additional syntax elements in the bitstream such as the number of padding pixels in the vertical or horizontal direction. Thus, a redundancy of the current syntax is reduced. Furthermore, the syntax becomes less error-prone since inconsistent configurations can be avoided. For instance, setting the number of padding pixels which still does not result in an integral multiple of the smallest coding unit can be avoided.

Hereinafter, a configuration of an image coding apparatus 300 according to this embodiment shall be described.

Figure 5:
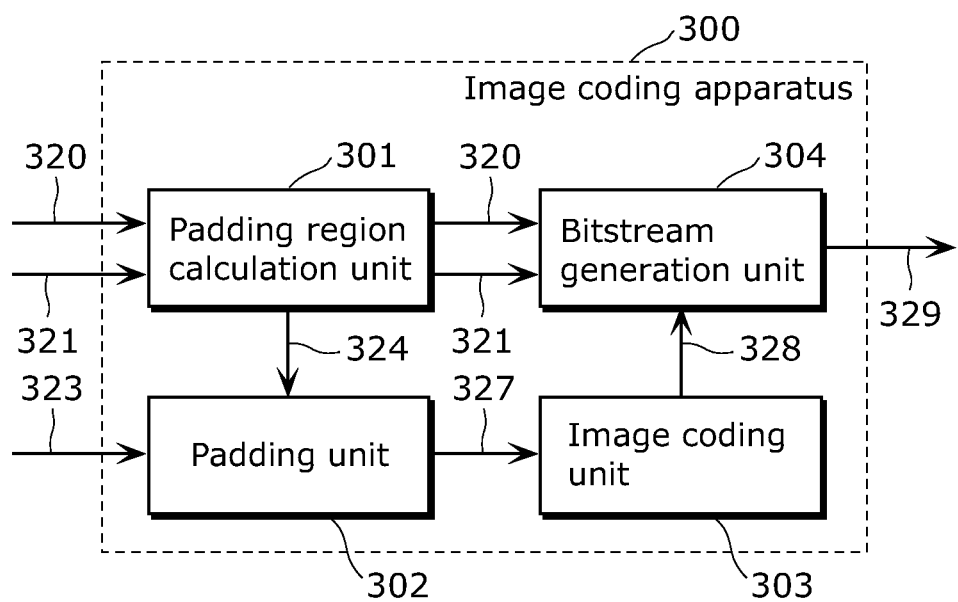
FIG. 5 is a block diagram of an image coding apparatus according to Embodiment 1 of the present invention.

FIG. 5 is a block diagram of the image coding apparatus 300 according to this embodiment. The image coding apparatus 300 shown in FIG. 5 codes an original image 323 to generate a bitstream 329. The image coding apparatus 300 includes a padding region calculation unit 301, a padding unit 302, an image coding unit 303, and a bitstream generation unit 304.

Here, the original image 323 to be coded may be of an arbitrary size. The original image 323 is input to the padding unit 302.

The padding region calculation unit 301 obtains an original image size 320 which is the image size of the original image 323. For instance, the padding region calculation unit 301 may determine the original image size 320 based on a header file of the original image 323 or a user input to the image coding apparatus 300, or determine the original image size 320 using other methods. In addition, the padding region calculation unit 301 obtains a smallest CU size 321. For instance, the smallest CU size 321 may be set by the user or may be predefined for use in an arbitrary encoder. In addition, the padding region calculation unit 301 may determine the smallest CU size 321 based on the profile or other coding settings of the image coding unit 303.

Furthermore, the padding region calculation unit 301 calculates a number-of-padding pixels 324 indicating at least one of the number of the rows and the number of the columns of the padding region to be added to the original image 323 so that the size of the padded image (internal size) is an integral multiple of the smallest CU size 321. In addition, the padding region calculation unit 301 sends the calculated number-of-padding pixels 324 to the padding unit 302.

The padding unit 302 adds, to the original image 323, an image having the number of columns or rows indicated by the number-of-padding pixels 324. Then, the padding unit 302 outputs an obtained padded image 327 to the image coding unit 303.

The bitstream generation unit 304 generates the bitstream 329 which includes the smallest CU size 321 and the original image size 320. This processing is preferably performed at the beginning of the image coding. For instance, the original image size 320 and the smallest CU size 321 are embedded within a sequence-specific parameter set, such as SPS in HEVC.

The image coding unit 303 codes the padded image 327 to generate a coded image signal 328. For example, the image coding unit 303 may be the image coding apparatus 100 shown in FIG. 1. It is to be noted that the image coding unit 303 may be any other image coding unit or video coding unit. Specifically, the image coding unit 303 divides the padded image 327 into coding units of different sizes, and codes the respective coding units in the way described above. Then, the image coding unit 303 sends the coded image signal 328 to the bitstream generation unit 304. The bitstream generation unit 304 generates the bitstream 329 which includes the coded image signal 328. The bitstream 329 is, for example, stored or transmitted.

Figure 6:
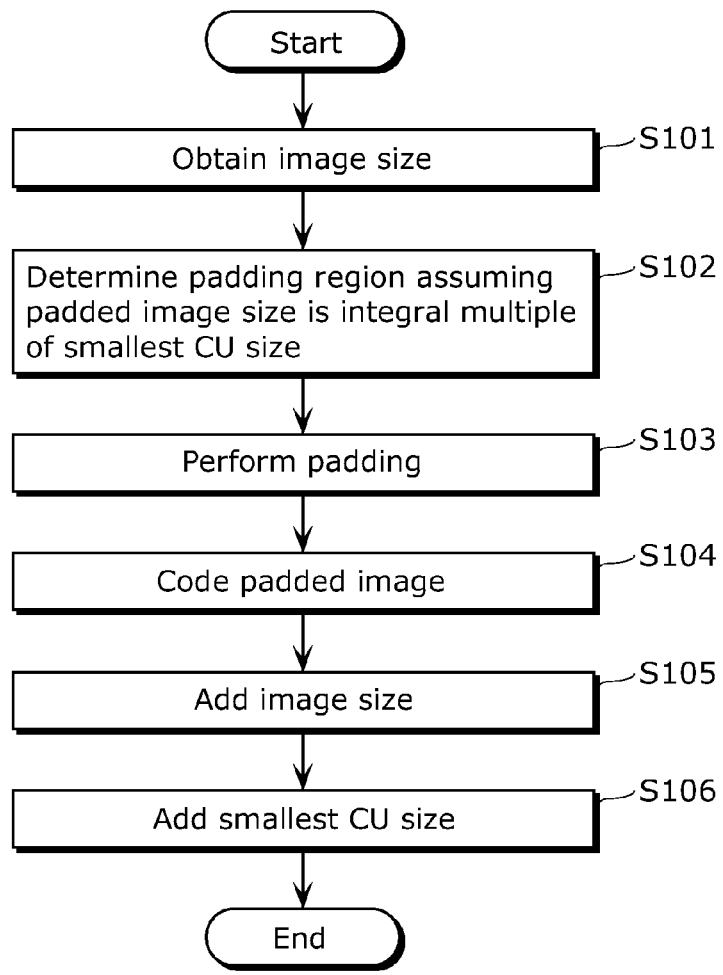
FIG. 6 is a flowchart of an image coding method according to Embodiment 1 of the present invention.

Next, the flow of the image coding method performed by the image coding apparatus 300 according to this embodiment shall be described. FIG. 6 is a flowchart of the image coding method performed by the image coding apparatus 300 according to this embodiment.

First, the padding region calculation unit 301 obtains the original image size 320 (S101). The original image size 320 is determined using various methods according to the implementation of the image coding apparatus 300. For example, the original image size 320 may be manually set by the user using a graphical user interface of a configuration file of the image coding apparatus. Furthermore, the original image size 320 may be extracted from the bitstream of the original image. For example, when the image or video sequence includes a header indicating the picture size, the original image size 320 may be extracted from the header. It is to be noted that the method of determining or obtaining the original image size 320 is not limited to the foregoing, and may be an other determining or obtaining method.

Furthermore, the smallest CU size 321 may be fixedly defined for the codec or for a particular profile of the coded. Furthermore, the smallest CU size 321 may be set within the syntax of the coded bitstream 329 as described above with reference to HEVC. This setting may be performed by a user, for instance, by means of a graphical user interface or a configuration file. Furthermore, the setting may be set automatically by the image coding apparatus 300 as a result of an optimization. In other words, this embodiment is not limited by the manner in which the smallest CU size 321 is set. Furthermore, the smallest coding unit may be square-formed as in the case of the HEVC. Moreover, the smallest coding unit may also have other shapes. The smallest coding unit may be a rectangular, for instance. 16×8, 8×4, 8×16, or similar. In other words, a smallest coding unit of any other size or shape is also applicable for this embodiment.

Next, the padding region calculation unit 301 judges whether or not the original image size 320 is an integral multiple of the smallest CU size 321. Specifically, the padding region calculation unit 301 judges whether or not the horizontal size of the original image 323 is an integral multiple of the horizontal size of the smallest CU, and judges whether or not the vertical size of the original image 323 is an integral multiple of the vertical size of the smallest CU.

When the horizontal size of the original image 323 is not an integral multiple of the horizontal size of the smallest CU, or the vertical size of the original image 323 is not an integral multiple of the vertical size of the smallest CU, the padding region calculation unit 301 calculates the number-of-padding pixels 324 (S102). The number-of-padding pixels 324 indicates the number of the rows or columns of pixels to be padded to the horizontal (top, bottom) or vertical (left, right) side of the image. Preferably, the term "pixels" corresponds to the positions of the luminance samples, and this is also the same in the case where the chrominance is sub-sampled.

Furthermore, the padding region calculation unit 301 calculates the number of pixels to be padded vertically or horizontally to the original image in order to achieve a size which is an integral multiple of the smallest CU size. Specifically, the padding region calculation unit 301, for instance, determines the number of rows or columns of pixels remaining after dividing the vertical or horizontal size of the image respectively by the vertical or horizontal size of the smallest CU. Then, the padding region calculation unit 301 calculates, as the number of padding rows or columns (i.e., the number-of-padding pixels 324), the difference between the smallest CU size and the size of the determined remaining pixels.

Next, the padding unit 302 performs the padding using the number-of-padding pixels 324 to generate the padded image 327 (S103). Specifically, the padding unit 302 adds the number of pixel columns or rows indicated by the number-of-padding pixels 324, to one or more sides of the original image 323.

It is to be noted that the padding unit 302 may add the number of pixel rows indicated by the number-of-padding pixels 324 to a predefined side out of the top and bottom sides. Likewise, the padding unit 302 may add the number of pixel columns indicated by the number-of-padding pixels 324 to a predefined side out of the left and right sides. This allows corresponding functioning of the image coding apparatus and the image decoding apparatus without explicitly specifying to which side the pixels are padded. Specifically, information indicating the side out of the top and bottom sides or the side out of the left and right sides to which the padding region is to be added does not need to be transmitted from the image coding apparatus to the image decoding apparatus.

Still alternatively, the padding unit 302 may add pixel rows by dividing the number of padding rows between the top side and the bottom side of the original image 323. For instance, the padding unit 302 may add an equal number of pixel rows to the top and bottom of the original image 323 when the calculated number of padding rows is even. Furthermore, the padding unit 302 may add more pixel rows to either the top or bottom side when the calculated number of padding rows is odd. Likewise, the padding unit 302 may add pixel columns by dividing the number of padding columns between the left side and the right side of the original image 323.

Furthermore, when both the number of padding rows and columns are indicated as the number-of-padding pixels 324, the padding unit 302 performs the above processing for rows and columns. In addition, the pixels to be padded may have a predefined value or may be determined as a function of the pixels in the proximity of the boundary. Such a function may be, for instance a weighted average of the pixels near the boundary.

Next, the image coding unit 303 codes the padded image 327 having the size of an integral multiple of the smallest CU, to generate the coded image signal 328 (S104).

Next, the bitstream generation unit 304 generates the bitstream 329 which includes the original image size 320, the smallest CU size 321, and the coded image signal 328 (S105 and S106). In this manner, by embedding the original image size 320 and the smallest CU size 321 in the bitstream 329, compatibility of image processing between the image coding apparatus and the image decoding apparatus can be ensured.

Furthermore, when the original image size 320 is an integral multiple of the smallest CU size 321 in step S102, padding (S103) is not performed. In other words, the image coding unit 303 codes the original image 323 to generate the coded image signal 328.

It is to be noted that FIG. 6 is only an example for illustrating the processing in this embodiment, and is not intended to limit the present invention. For instance, the order of steps S105 and S106 may be reversed. Furthermore, typically, the original image size 320 is written into the bitstream 329 before the smallest CU size 321 is written. However, this order of embedding may also be reversed. In addition, steps S105 and S106 may be performed ahead of step S104. In present codecs, these syntax elements are included in the sequence parameter set or the picture parameter set. Since these parameter sets are coded before the coding of the picture, these syntax elements are written into the bitstream before step S104.

The embedding here refers to ordering the syntax elements according to a predefined syntax into the bit-stream. Furthermore, the syntax elements may be represented by fix-length coding or variable-length coding. Especially in the case when some values are more probable than other values of the same syntax element, variable-length coding is more beneficial. The variable length coding may be any entropy coding such as integer coding (for instance Elias codes or Golomb codes), Huffman codes (fixed or context adaptive), or arithmetic codes (with a fixed or context adaptive probability model).

Hereinafter, the image decoding apparatus according to this embodiment shall be described.

Figure 7:
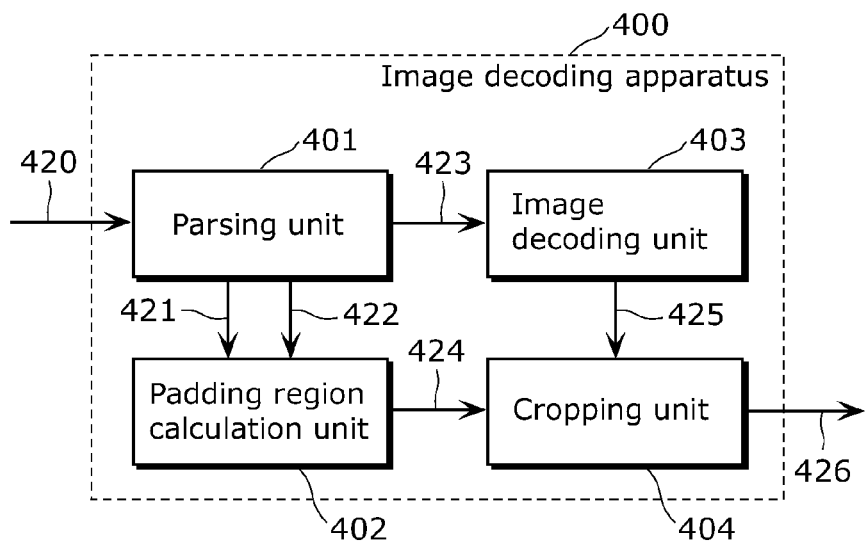
FIG. 7 is a block diagram of an image decoding apparatus according to Embodiment 1 of the present invention.

FIG. 7 is a block diagram of an image decoding apparatus 400 according to this embodiment. The image decoding apparatus 400 decodes a bitstream 420 to generate an image signal 426. The image decoding apparatus 400 includes a parsing unit 401, a padding region calculation unit 402, an image decoding unit 403, and a cropping unit 404.

The parsing unit 401 either receives the bitstream 420 from a communication channel or obtains the bitstream 420 from a storage unit. The bitstream 420, for instance, is the bitstream 329 generated by the above-described image coding apparatus 300. Specifically, the parsing unit 401 extracts, from the bitstream 420, an original image size 421 which is the image size before padding, and a smallest CU size 422. The parsing unit 401 further extracts a coded image signal 423 from the bitstream 420. Then, the parsing unit 401 sends the coded image signal 423 to the image decoding unit 403.

The image decoding unit 403 decodes the coded image signal 423 on a per coding unit basis to generate a decoded image 425 which corresponds to the padded image 327 at the image coding apparatus 300. However, due to irreversible compression such as quantization, the quality of the decoded image 425 may be lower than the quality of the padded image 327. Furthermore, the image decoding unit 403 is for instance the image decoding apparatus 200 shown in FIG. 2.

The padding region calculation unit 402 and the cropping unit 404 are provided for the purpose of obtaining a picture in the size of the original image before padding.

The padding region calculation unit 402 obtains the original image size 421 and the smallest CU size 422 that have been extracted from the bitstream 420 by the parsing unit 401. In the same manner as with the padding region calculation unit 301 in the image coding apparatus 300, the padding region calculation unit 402 calculates, based on the original image size 421 and the smallest CU size 422, a number-of-padding pixels 424 indicating the number of pixels (number of padding columns or number of padding rows) of the padding region that was added to the original image at the image coding apparatus 300. Specifically, padding region calculation unit 402 calculates, as the number of padding rows and the number of padding columns, the difference between the original image size 421 before padding and an integral multiple of the smallest CU size closest to, but larger than the respective vertical and horizontal size of the original image (see Equation 1 above). Furthermore, the padding region calculation unit 402 sends the determined number-of-padding pixels 424 to the cropping unit 404.

The cropping unit 404 cuts off the number-of-padding pixels 424 from the padded image (decoded image 425) to generate the image signal 426 which is a picture in the image size without the padding region. Furthermore, in the image decoding apparatus 400, the image signal 426 may be displayed on a display, or stored in a storage unit, or further processing may be performed on the image signal 426.

Figure 8:
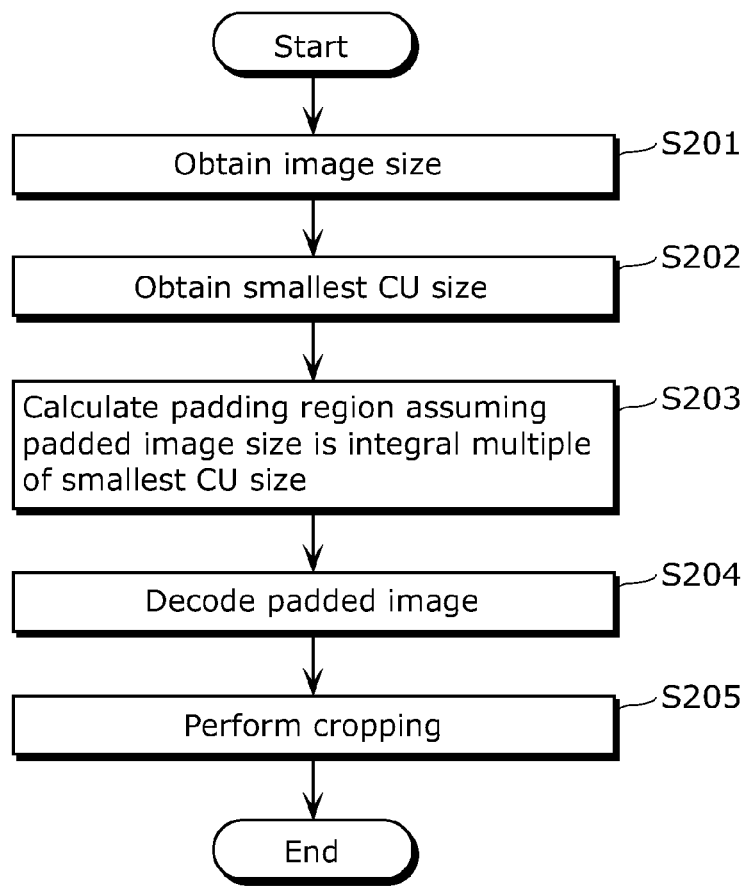
FIG. 8 is a flowchart of an image decoding method according to Embodiment 1 of the present invention.

Next, the flow of the image decoding method performed by the image decoding apparatus 400 according to this embodiment shall be described. FIG. 8 is a flowchart of the image decoding method performed by the image decoding apparatus 400 according to this embodiment.

Here, for instance, the bitstream 420 input to the image decoding apparatus 400 is the bitstream 329 generated according to the image coding method shown in FIG. 6.

First, the parsing unit 401 parses the bitstream 420. Then, the parsing unit 401 obtains the original image size 421 embedded in the bitstream 420 (S201). The original image size 421 is transmitted to the image decoding unit 403 for image decoding.

Furthermore, the parsing unit 401 also extracts the smallest CU size 422 from the bitstream 420 (S202).

Next, the padding region calculation unit 402 calculates the number-of-padding pixels 424 indicating the number of pixels that have been added to the image at the image coding apparatus 300 (S203). It is to be noted that the details of this processing are the same as the processing in step S102 in the image coding method shown in FIG. 6. Specifically, the padding region calculation unit 402 judges whether or not the original image size 421 is an integral multiple of the smallest CU size 422. More specifically, the padding region calculation unit 402 judges whether or not the horizontal size of the original image is an integral multiple of the horizontal size of the smallest CU, and judges whether or not the vertical size of the original image is an integral multiple of the vertical size of the smallest CU. When the horizontal size of the original image is not an integral multiple of the horizontal size of the smallest CU, or when the vertical size of the original image is an integral multiple of the vertical size of the smallest CU, the padding region calculation unit 402 calculates the number-of-padding pixels 424 so that the padded image is an integral number of the smallest CU size 422. Specifically, the padding region calculation unit 402 calculates as the number of padding columns or number of padding rows, the difference between the reminder after dividing the vertical and the horizontal size of the original image by the smallest CU size and the smallest CU size (see Equation 1 above). Moreover, when the smallest coding unit is not square-shaped, the padding region calculation unit 402 divides the vertical size of the original image by the vertical size of the smallest CU, and divides the horizontal size of the original image by the horizontal size of the smallest CU.

Next, the image decoding unit 403 decodes the coded image signal 423 to generate the decoded image 425 (the padded image) (S204).

Next, the cropping unit 404 performs cropping on the decoded image 425 to generate the image signal 426 (S205). Specifically, the cropping unit 404 crops an image having the number of rows or columns indicated by the number-of-padding pixels 424 calculated in step S203, from the decoded image 425. With this, the image signal 426 becomes a picture with a size corresponding to the picture size of the original image before coding.

It is to be noted that this embodiment is not concerned with the method of determining padding data. An arbitrary padding data determining method may be used in this embodiment. Typically, the padding is performed by adding, to the original image, a padding region resulting from the repetition of the pixels at the border of the picture. Specifically, the padding region may be added by repeating the same line (column or row) or by repeating plural lines that are closest to the border. However, other methods may be employed as well and more sophisticated determination of padding data based on coding unit optimization may be performed.

Furthermore, in the example described above, it has been assumed that the number of padding pixels is always less than the smallest CU size. In other words, the considered number of padding pixels has always been the minimum number necessary to code the pictures. In other words, the image coding apparatus and the image decoding apparatus may determine the number of padding pixels based on this assumption. Such an assumption has also consequences on the subdivision of the picture into coding units of different sizes in HEVC. Assume the case where a smallest coding unit of 8×8 and a largest coding unit of 16×16 is used, and an original image with a vertical size of 128 pixels and a horizontal size of 141 pixels. In this case, when the picture is only divided into coding units of the largest CU size, the horizontal size of the picture will be two times the size of the largest coding unit (resulting in 128 luminance samples) plus remaining 13 samples. However, 13 is still larger than the smallest CU size and therefore, the 13 samples are further segmented to one coding unit of size 16×16, or two coding units of size 8×8 which are coding units of smaller size. After such subdivision, only three rows of pixels remain to be padded. In other words, the minimum granularity when a picture is segmented based on the input picture size (original image size) is determined depending on the method of determining the number of padding pixels in the image coding apparatus and the image decoding apparatus. In the above-described example, coding units of size 16×16 or smaller are used on the right border of the image. Here, it is not possible to use a coding unit of size 32×32 on the right border. This is because doing so would go against the aforementioned assumption.

However, from the point of view of coding efficiency, there are instances where larger coding units may be more advantageous. For instance, at the picture boundaries, a coding unit is automatically further split if the size of the coding unit is bigger than the number of remaining pixels. This results, for some images, in many small coding units at boundaries. As a result, the coding efficiency may decrease, since more prediction information may be generated and transmitted.

Therefore, the padding may be performed according to the method described below. The number of padding pixels is made adjustable so that the image coding apparatus can realize the optimal number of padding pixels and CU size at the picture boundaries. Specifically, one or more additional syntax elements are added to the bitstream so that number of padding pixels to be used can be set higher than the necessary minimum number of padding pixels. This syntax element is the number of padding SCUs (pad_right) indicating the number of smallest CUs included in the padding region.

Figure 9:
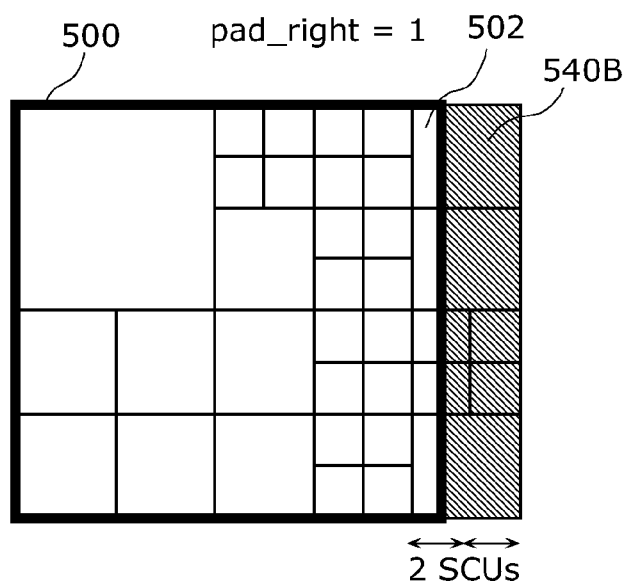
FIG. 9 is a diagram illustrating a modification of the padding according to Embodiment 1 of the present invention.

A specific example is described below. FIG. 9 shows an example in which the number of padding SCUs at the right border of the image is "1" ("pad_right=1"). It is to be noted that the above-described example in FIG. 4 shows the case where the number of padding SCUs is "0" ("pad_right=0"). Specifically, the number of padding pixels is equal to or greater than SCU size×pad_right. Furthermore, in the example in FIG. 9, the total width of the image region 502 at the right border of the original image 500 and a padding region 540B is twice the width of the SCU. In this manner, the coding efficiency can be improved by setting a higher number of padding pixels than the smallest coding unit.

Specifically, the number of padding rows N can be calculated using (Equation 2) below.

[Math. 2]

$$N = s - (w \% s) + \text{pad\_right} * s \qquad \text{(Equation 2)}$$

Here, s is the horizontal size of the smallest coding unit, w is the width of the original image, pad_right is the syntax element indicating the number of padding SCUs, and % is the modulo operation.

It is to be noted that pad_left may be used to replace pad_right in the case where padding on the left hand side of the image is performed. Similarly, number of padding SCUs for vertical padding may be indicated using pad_top or pad_bottom. Furthermore, two or more of these syntax elements may be used at the same time.

In this case, a step in which the number of padding SCUs is embedded into the bitstream by the bitstream generation unit 304 is added to the image coding method shown in FIG. 6. Similarly, a step in which the number of padding SCUs extracted from the bitstream by the parsing unit 401 is added to the image decoding method shown in FIG. 8. With this, the number of padding SCUs is used at the image coding apparatus 300 and the image decoding apparatus 400 in the same way. Therefore, the number of padding pixels can be unambiguously derived at the image coding apparatus and the image decoding apparatus.

Furthermore, in step S102 in FIG. 6 and step S203 in FIG. 8, the padding region calculation unit 301 or the padding region calculating unit 402 calculates the number of padding pixels as a sum of a value obtained by multiplying the number of padding SCUs by the smallest CU size, and the minimum necessary number of padding pixels (see Equation 2 above).

In order to realize further flexibility, according to a modification of the above-described embodiment, the number of padding SCUs may be indicated separately for two or more of the four picture boundaries: the top, bottom, left, and right. Specifically, pad_right may be used for additional padding on the right, pad_below may be used for additional padding below, pad_up may be used for additional padding up, and pad_left may be used for additional padding left. With this, the image coding apparatus can determine the number of padding pixels in such a way that the resulting image distortion is optimized.

Here, each of these syntaxes is padding direction information indicating one of the top, bottom, left, and right sides of the image.

Figure 10:
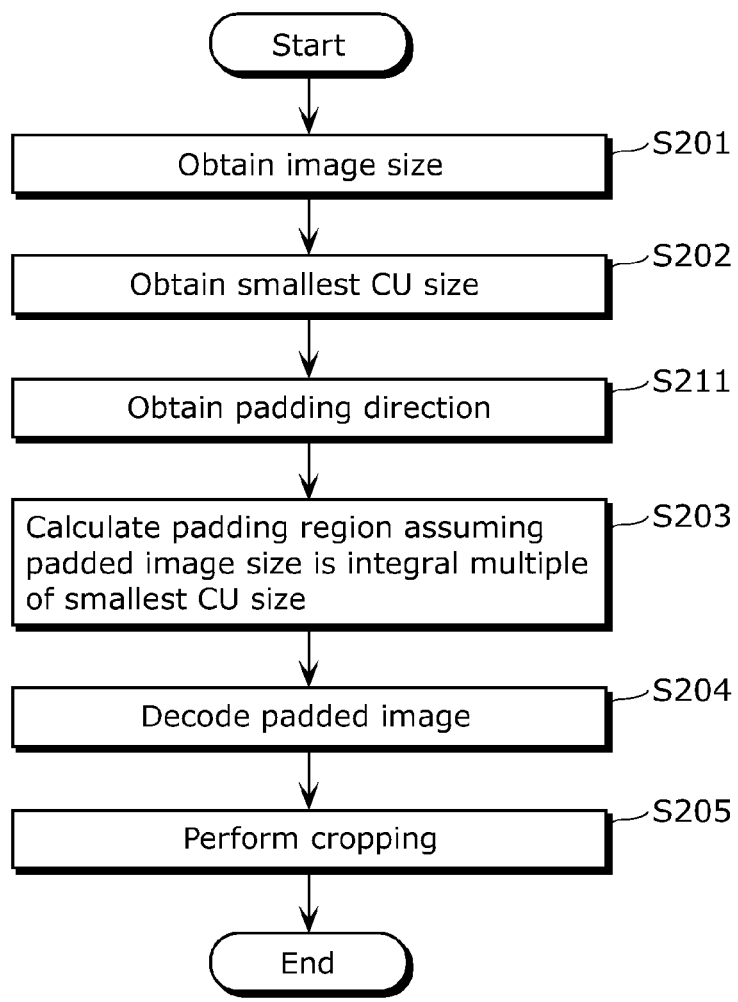
FIG. 10 is a flowchart of a modification of the image decoding method according to Embodiment 1 of the present invention.

FIG. 10 is a flow chart of an image decoding method in the case where such padding direction information is used. In the image decoding method shown in FIG. 10, a step S211 is added in addition to the processing shown in FIG. 8. In step S211, the parsing unit 401 extracts padding direction information from the bitstream 420. Then, in step S205, the cropping unit 404, crops an image having the number of rows or columns indicated by the number-of-padding pixels 424, from the decoded image 425 at any of the top, bottom, left, and right sides that is indicated by the padding direction information.

Furthermore, for an embodiment with determination of the number of padding pixels smaller than the SCU size, a signal indicating to which image borders (top, bottom, left, right) the padding pixels are to be divided may be used. Furthermore, it may then be predefined, how the padding pixels are subdivided to the bottom and top, or to the left and right borders.

Furthermore, padding information (smallest CU size, number of padding SCUs, or padding direction information, etc.) may be added per video sequence classified according to the content of the images. For example, the image coding apparatus may add padding information within the parameter set instead of adding the padding information within the sequence parameter set. Here, the sequence parameter set is a sequence-specific parameter set, and includes information related to the sequence. Furthermore, the picture parameter set is a picture-specific parameter set, and includes information related to a picture. For instance, in terms of HEVC, it is preferable that the padding information be transmitted by being included in the PPS rather than in the SPS. For instance, the image coding apparatus may transmit the smallest CU size within the PPS. Furthermore, the image coding apparatus may transmit the padding information within the PPS or SPS, independently of signaling frequency of the image size or the smallest CU size.

Embodiment 2

In this embodiment, an image decoding apparatus which performs error judgment using the assumption that "the image size is an integral multiple of the smallest CU size" used in Embodiment 1. It is to be noted that, hereinafter, description shall be carried out primarily on the points of difference with Embodiment 1 and overlapping description shall be omitted.

Figure 11:
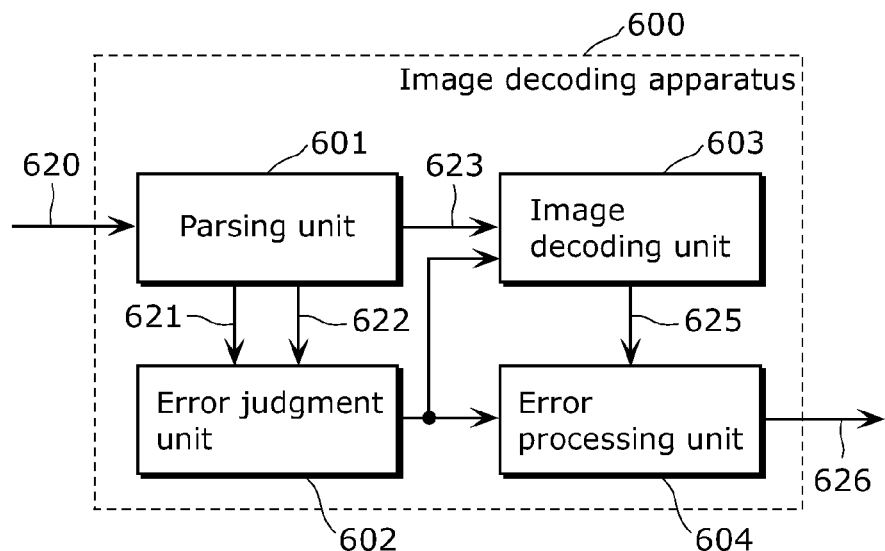
FIG. 11 is a block diagram of an image decoding apparatus according to Embodiment 2 of the present invention.

FIG. 11 is a block diagram of an image decoding apparatus 600 according to this embodiment. The image decoding apparatus 600 shown in FIG. 11 decodes a bitstream 620 to generate an image signal 626. The image decoding apparatus 600 includes a parsing unit 601, an error judgment unit 602, an image decoding unit 603, and an error processing unit 604.

The parsing unit 601 extracts an image size 621, a smallest CU size 622, and a coded image signal 623 from the bitstream 620. It is to be noted that although an example in which the size of the original image is included in the bitstream 620 is described in Embodiment 1, in this embodiment, the image size 621 which is the size of the padded image is included in the bitstream 620. It is to be noted that the image size 621 indicates the size of the original image in the case where padding is not performed at the image coding apparatus, that is, in the case where the original image size is an integral multiple of the smallest CU size. Furthermore, the image size 621 indicates the size of the padded image in the case where padding is performed at the image coding apparatus.

The error judgment unit 602 is a judgment unit which judges whether or not the image size 621 is an integral multiple of the smallest CU size 622.

The image decoding unit 603 decodes the coded image signal 623 to generate a decoded image 625. For instance, the image decoding unit 603 is the image decoding apparatus 200 shown in FIG. 2. Furthermore, when the error judgment unit 602 judges that the image size 621 is an integral multiple of the smallest CU size 622, the image decoding unit 603 decodes the coded image signal 623 using the image size 621 to generate a decoded image 625.

When the error judgment unit 602 judges that the image size 621 is not an integral multiple of the smallest CU size 622, the error processing unit 604 determines that an error is included in the bitstream 620. Furthermore, the error processing unit 604, upon determining that that an error is included in the bitstream 620, performs error processing. Furthermore, the error processing unit 604 notifies the outside that an error is included in the bitstream 620.

Here, as described above, the size of the image to be coded needs to be an integral multiple of the smallest CU size. Specifically, the image size 621 needs to be an integral multiple of the smallest CU size. Therefore, the image decoding apparatus 600 according to this embodiment judges whether or not the value of the image size 621 included in the bitstream 620 is correct based on whether or not the image size 621 is an integral multiple of the smallest CU size. This allows the image decoding apparatus 600 to appropriately judge whether or not an error is included in the bitstream 620.

Accordingly, for example, when the image size 621 indicates an erroneous value due to a communication error or an error at the image coding apparatus side, the occurrence of an error can be notified to the outside.

Figure 12:
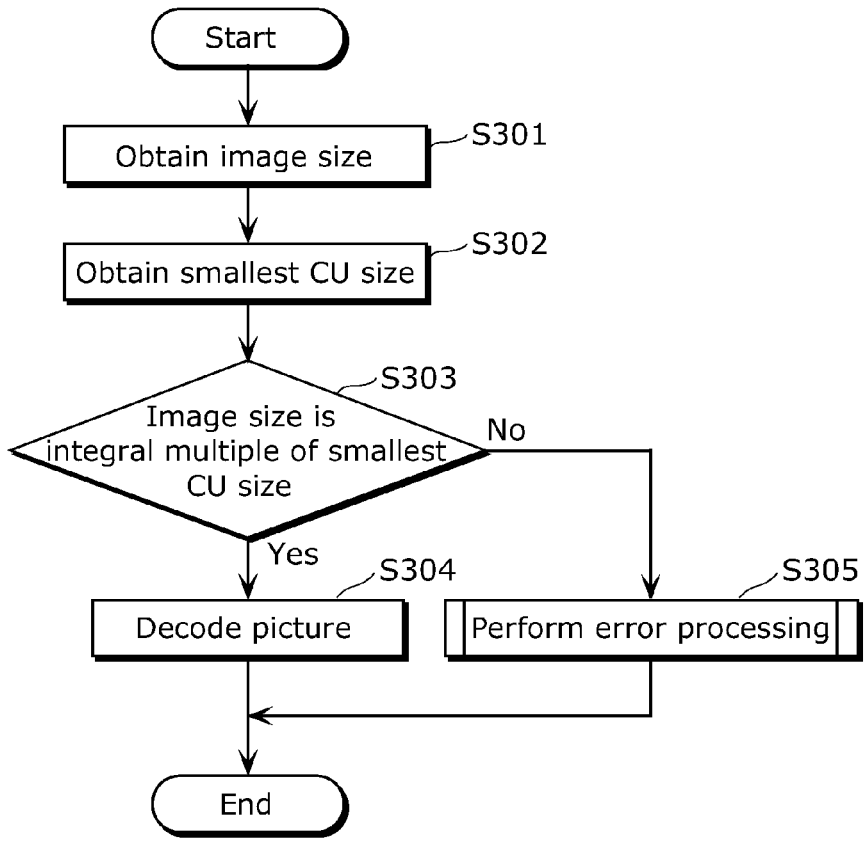
FIG. 12 is a flowchart of an image decoding method according to Embodiment 2 of the present invention.

Hereinafter, the flow of an image decoding method performed by the image decoding apparatus 600 according to this embodiment shall be described. FIG. 12 is a flowchart of the image decoding method.

First, the parsing unit 601 extracts the image size 621, the smallest CU size 622, and the coded image signal 623 from the bitstream 620 (S301 and S302).

Next, the error judgment unit 602 judges whether or not the image size 621 is an integral multiple of the smallest CU size 622 (S303).

When the image size 621 is an integral multiple of the smallest CU size 622 (Yes in S303), the image decoding unit 603 decodes the coded image signal 623 using the image size 621 to generate the coded image 625 (S304). Specifically, the image decoding unit 603 decodes the coded image signal 623 using, as the image size, the image size indicated by the image size 621. It is to be noted that, in this case, the image decoding apparatus 600 outputs the decoded image 625 as the image signal 626. Furthermore, when the image is padded, the image decoding unit 603 may perform cropping using the image size 621 and the padding information (for example, the number of padding pixels) included in the bitstream.

On the other hand, when the image size 621 is not an integral multiple of the smallest CU size 622 (No in S303), the error processing unit 604 determines that an error is included in the bitstream 620, and performs error processing (S305).

Figure 13:
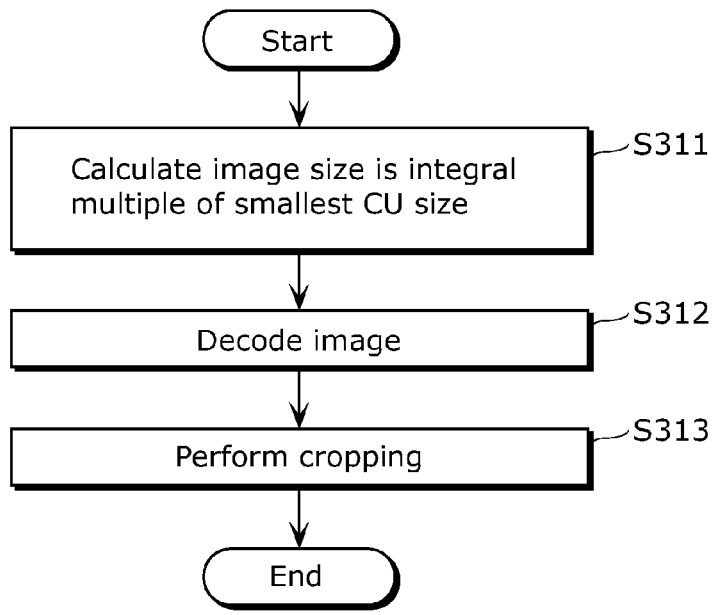
FIG. 13 is a flowchart of error processing according to Embodiment 2 of the present invention.

It is to be noted that the processing described below may be performed as error processing. FIG. 13 is a flowchart showing an example of the error processing by the error processing unit 604.

First, the error processing unit 604 calculates the correct image size assuming that the correct image size is an integral multiple of the smallest CU size. Then, the error processing unit 604 calculates the number of padding rows or the number of padding columns, based on the difference between the extracted image size 621 and the assumed image size (S311). It is to be noted that a specific example of this processing is the same as a case where, in the processing by the padding region calculation unit 402 in the previously described Embodiment 1, the image size 621 which includes an error is replaced with the original image size, and the size of the padded image is replaced with the correct image size. For example, among the image sizes which are integer multiples of the smallest CU size, the error processing unit 604 determines, as the correct image size, an image size that is closest to but larger than the image size indicated by the image size 621.

Next, the image decoding unit 603 decodes the coded image signal 623 using the image size assumed in step S312, to generate the decoded image 625 (S312).

Lastly, the error processing unit 604 crops an image having the number of padding rows or the number of padding columns calculated in step S311, from the decoded image 625 generated in step S312, to generate the image signal 626 (S313).

With the above-described processing, the image decoding apparatus 600 can generate an image signal 626 even when the value of the image size 621 is an erroneous value.

It is to be noted that padding information may be included in the bitstream 620. Here, padding information refers to, for example, the information indicating the number of padding pixels or the padding direction information, and so on described earlier. Furthermore, in this case, the error judgment unit 602 may determine the padding region using this padding information.

Specifically, the parsing unit 601 extracts, from the bitstream 620, padding direction information indicating one of the top, bottom, left, and right sides of the image. Then, the error processing unit 604 may crop an image having the number of padding rows or number of padding columns, from the decoded image 625 at any of the top, bottom, left, or right side indicated by the padding direction information. Here, the value of the number of padding rows or number of padding columns is, for example, the value calculated in step S311. It is to be noted that, when information indicating the number of padding rows or number of padding columns is included in the bitstream 620, the value of the number of padding rows or number of padding columns may be the value indicated by the information included in the bitstream 620.

Furthermore, these padding information are, for example, included in the picture parameter set or sequence parameter set of the bitstream 620.

Furthermore, in addition to the above-described error processing, the error processing unit 604 may also output, to the outside, information indicating the occurrence of an error.

Hereinafter, an image coding apparatus and an image coding method according to this embodiment shall be described.

As described above, although an example in which the size of the original image is included in the bitstream is described in Embodiment 1, in this embodiment, the image size (image size 621) which is the size of the padded image is included in the bitstream. In other words, the image coding method according to this embodiment is different from Embodiment 1 in terms of the processing in step S105 in FIG. 6. Specifically, in step S105, the image coding method according to this embodiment generates a bitstream that includes the size of the padded image as the image size, instead of the original image size. Here, the image size indicates the number of pixels (number of columns and number of rows) included in the image.

It is to be noted that the image size indicates the size of the original image in the case where padding is not performed at the image coding apparatus, that is, in the case where the original image size is an integral multiple of the smallest CU size. Furthermore, the image size indicates the size of the padded image in the case where padding is performed at the image coding apparatus.

Specifically, the image coding method according to this embodiment includes an image size calculating step (S102) of calculating, as the image size, the number of pixels which is an integral multiple of the smallest CU size, and a bitstream generation step (S105 and S106) of generating a bitstream that includes the smallest CU size and the calculated number of pixels.

It is to be noted that the same method as that in Embodiment 1 can be used as the specific method of calculating the image size (the size of the padded image).

Specifically, the image coding apparatus according to this embodiment includes an image size calculation unit (the padding region calculation unit 301) which calculates, as the image size, the number of pixels which is an integral multiple of the smallest CU size, and a bitstream generation unit 304 which generates a bitstream that includes the smallest CU size and the calculated number of pixels.

The above-described configurations enable the image coding apparatus and the image coding method according to this embodiment to generate a bitstream that allows appropriate detection of an error at the image decoding apparatus.

Although image coding apparatuses and image decoding apparatuses according to the embodiments of the present invention have been described thus far, the present invention is not limited to such embodiments.

For example, at least part of the functions of the image coding apparatuses, image decoding apparatuses, and modifications thereof according to the above-described embodiments may be combined.

Furthermore, the separation of the function blocks in the block diagrams is merely an example, and plural function blocks may be implemented as a single function block, a single function block may be separated into plural function blocks, or part of functions of a function block may be transferred to another function block. Furthermore, the functions of function blocks having similar functions may be processed, in parallel or by time-sharing, by a single hardware or software.

Furthermore, the sequence in which the above-described steps are executed is given as an example to describe the present inventive concept in specific terms, and thus other sequences are possible. Furthermore, part of the above-described steps may be executed simultaneously (in parallel) with another step.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 14:
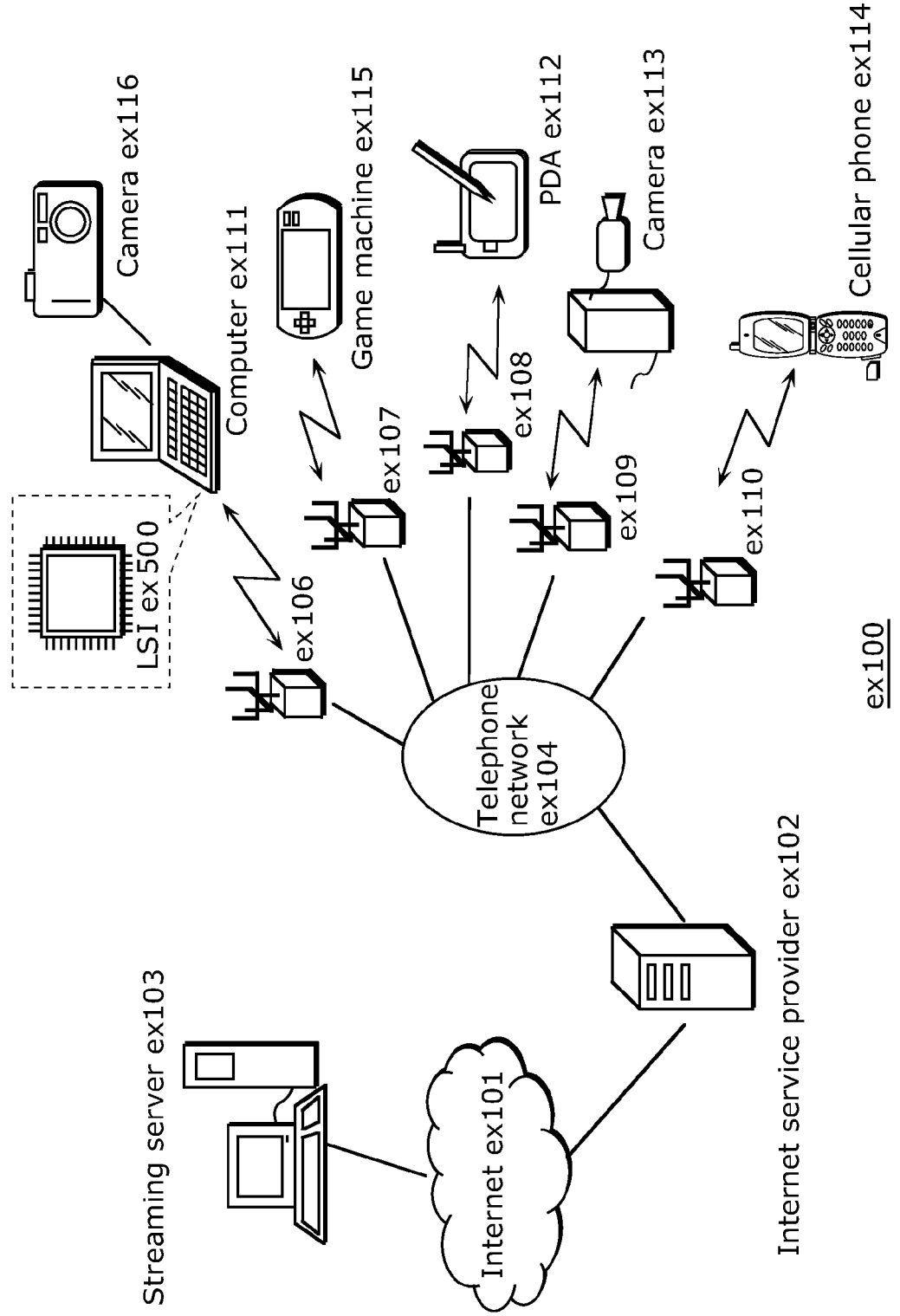
FIG. 14 is a diagram of an overall configuration of a content providing system for implementing content distribution services.

FIG. 14 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 14, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 15:
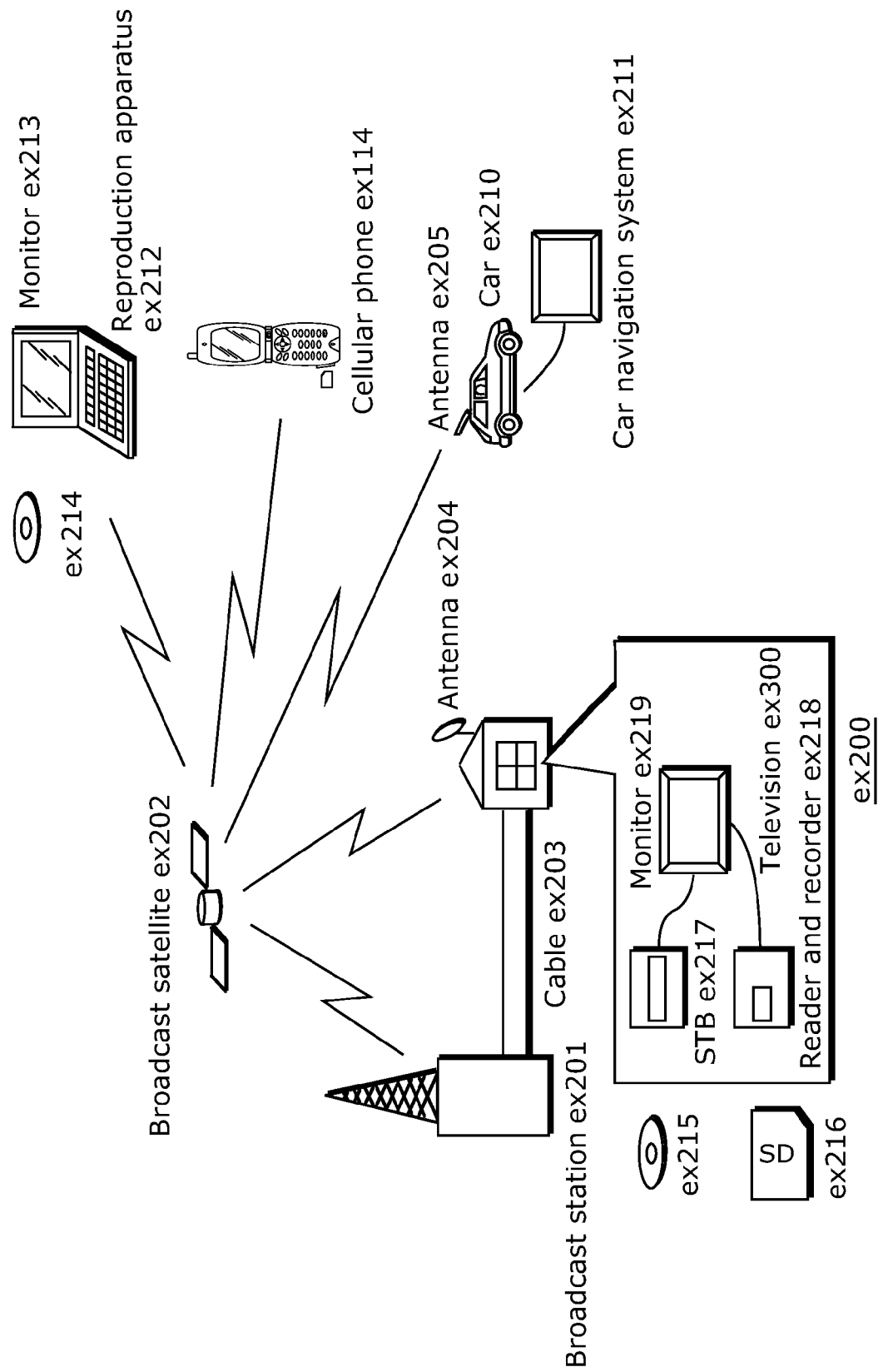
FIG. 15 is a diagram of an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 15. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300.

The moving picture decoding apparatus may be implemented not in the set top box but in the television ex300.

Figure 16:
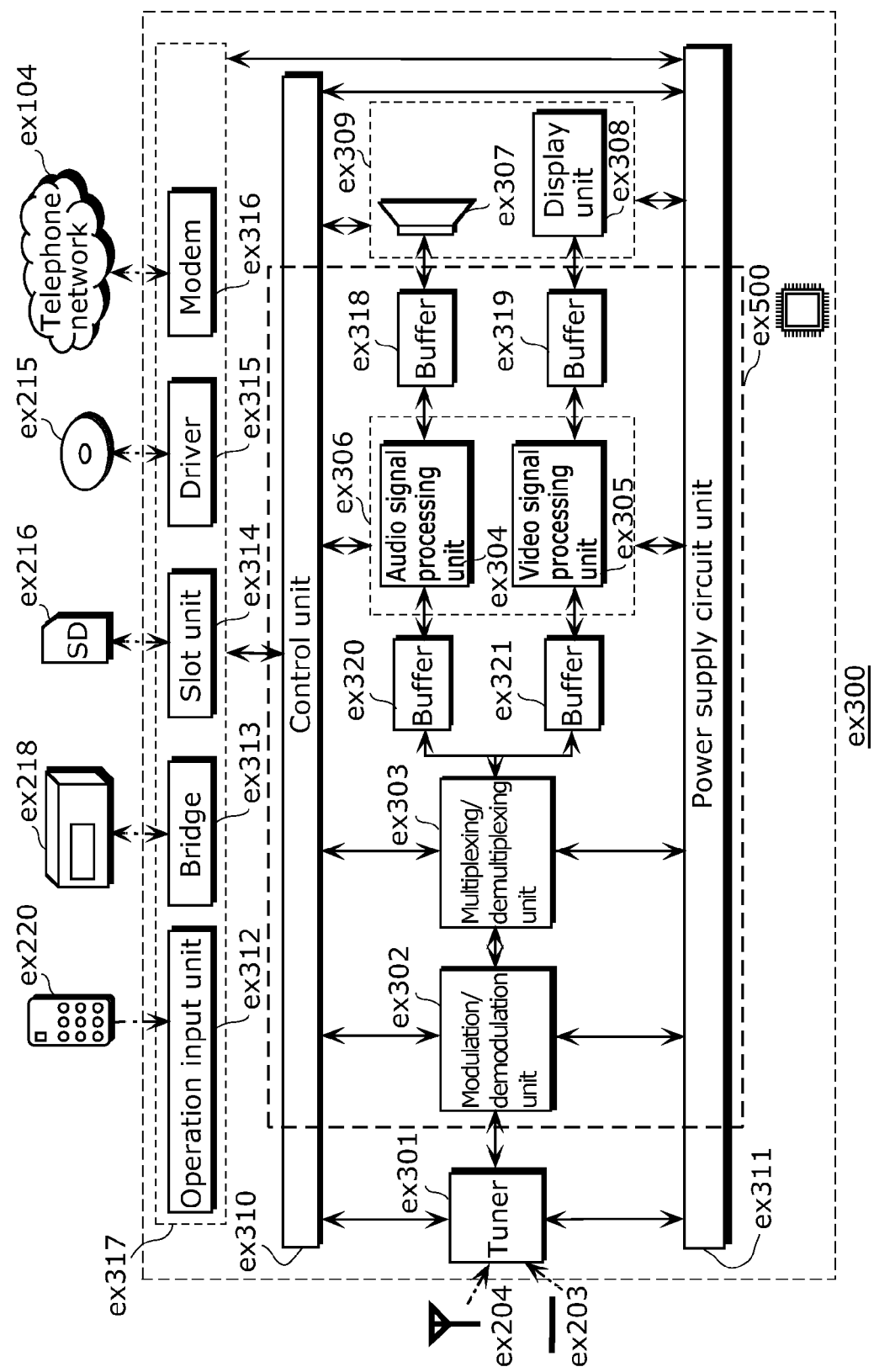
FIG. 16 is a block diagram illustrating an example of a configuration of a television.

FIG. 16 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexer the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 17:
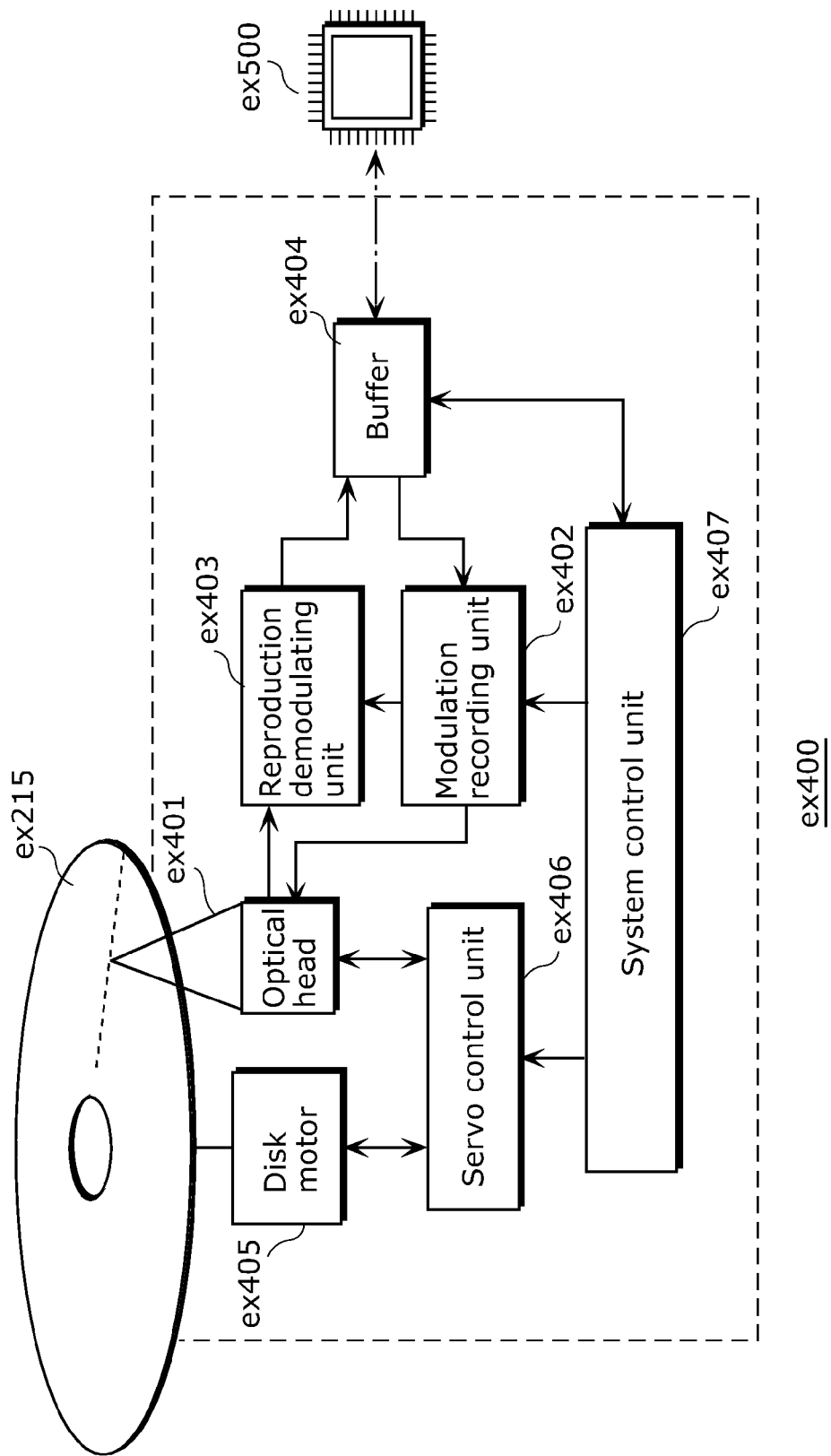
FIG. 17 is block diagram illustrating an example of a configuration of an information reproducing/recording unit that reads and writes information from and on a recording medium that is an optical disk.

As an example, FIG. 17 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 18:
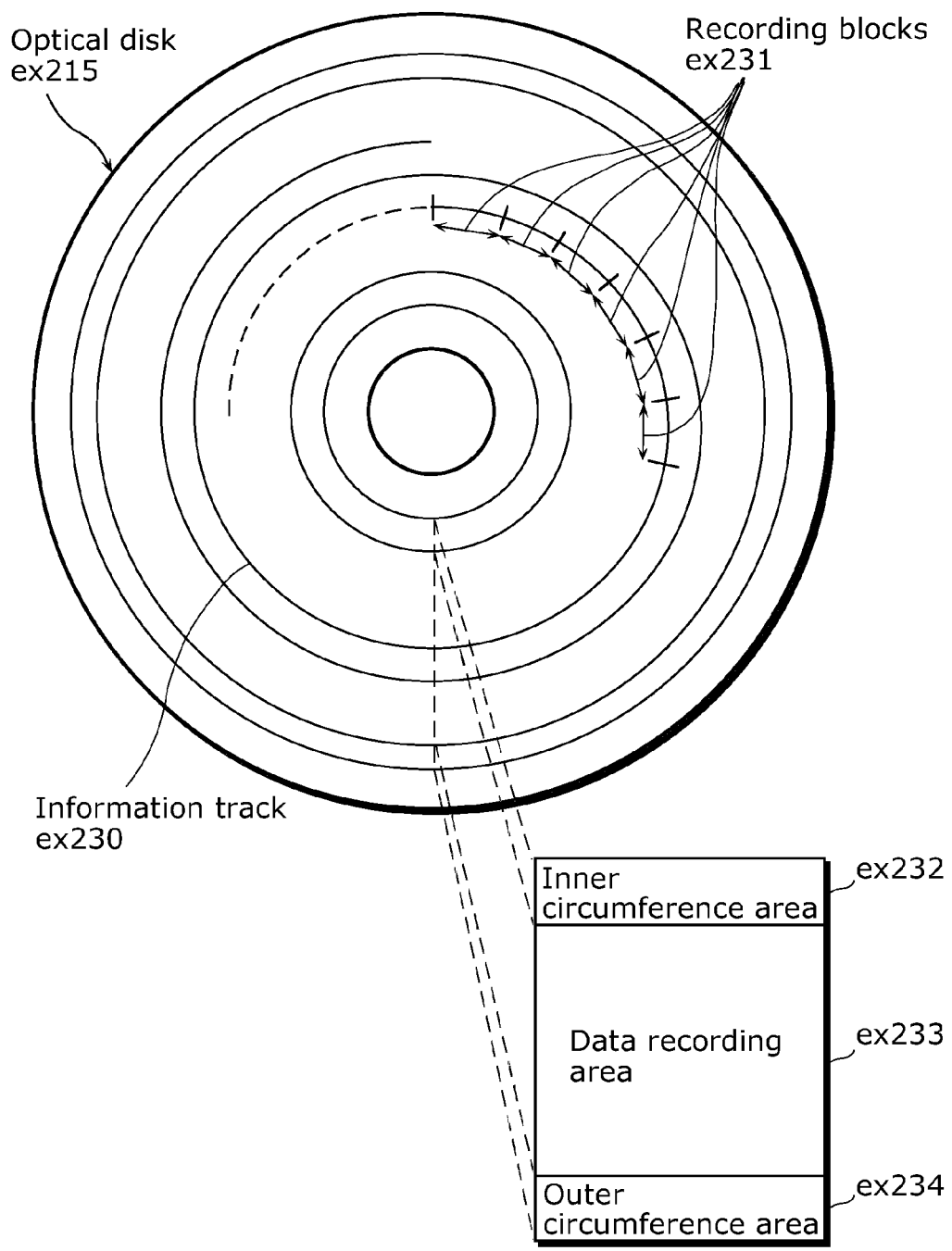
FIG. 18 is a diagram illustrating an example of a configuration of a recording medium that is an optical disk.

FIG. 18 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 16. The same will be true for the configuration of the computer ex111, the cellular phone ex114, and others.

Figure 19A:
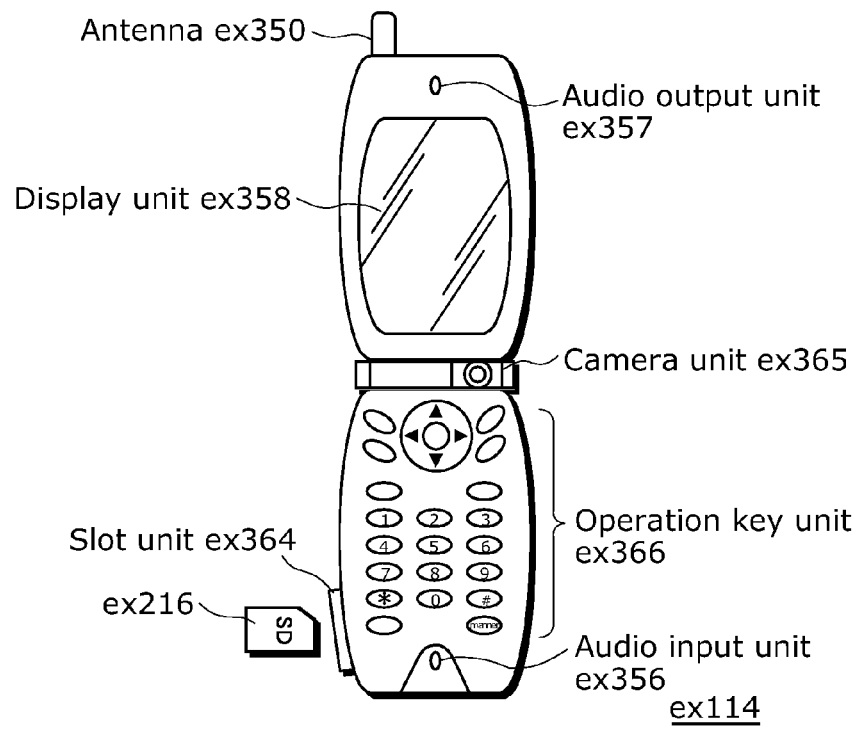
FIG. 19A is a diagram illustrating an example of a cellular phone.

FIG. 19A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 19B:
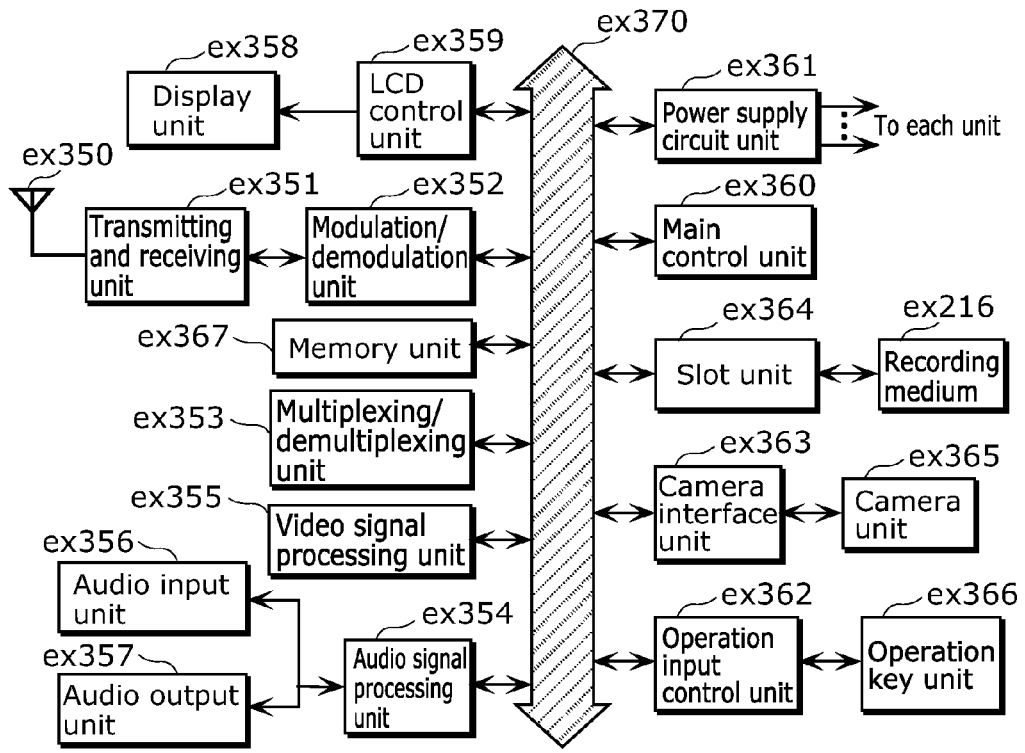
FIG. 19B is a block diagram illustrating an example of a configuration of a cellular phone.

Next, an example of a configuration of the cellular phone ex114 will be described with reference to FIG. 19B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 20 illustrates a structure of the multiplexed data. As illustrated in FIG. 20, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 21:
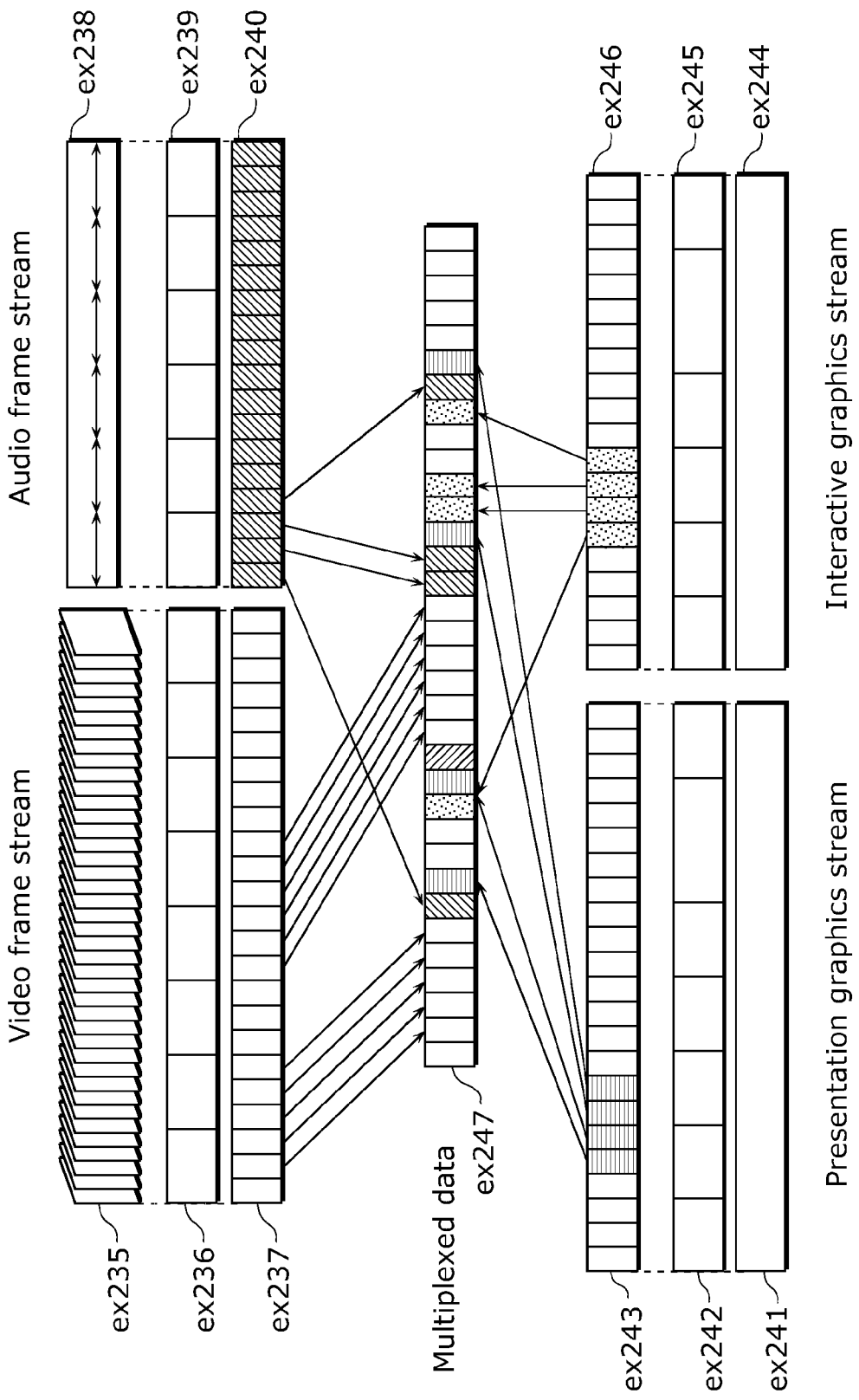
FIG. 21 is a diagram schematically illustrating how each stream is multiplexed in multiplexed data.

FIG. 21 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 22:
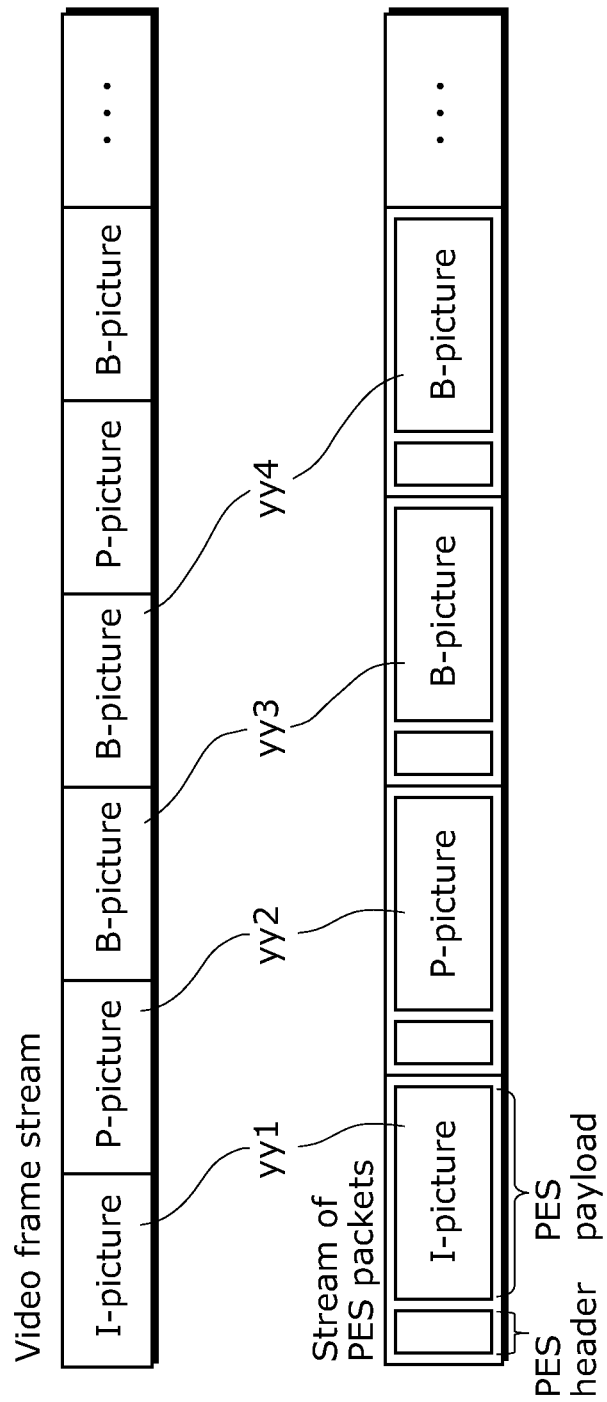
FIG. 22 is a diagram illustrating how a video stream is stored in a stream of PES packets in more detail.

FIG. 22 illustrates how a video stream is stored in a stream of PES packets in more detail. The first bar in FIG. 22 shows a video frame stream in a video stream. The second bar shows the stream of PES packets. As indicated by arrows denoted as yy1, yy2, yy3, and yy4 in FIG. 22, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 23:
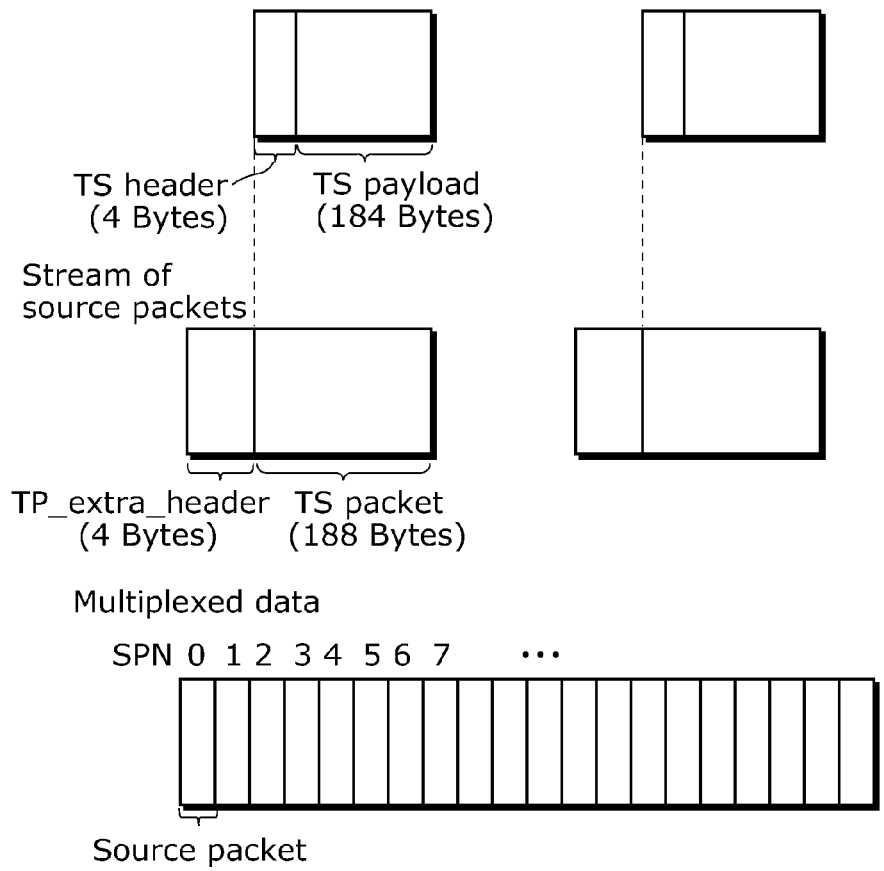
FIG. 23 is a diagram illustrating a structure of TS packets and source packets in the multiplexed data.

FIG. 23 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 23. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 24:
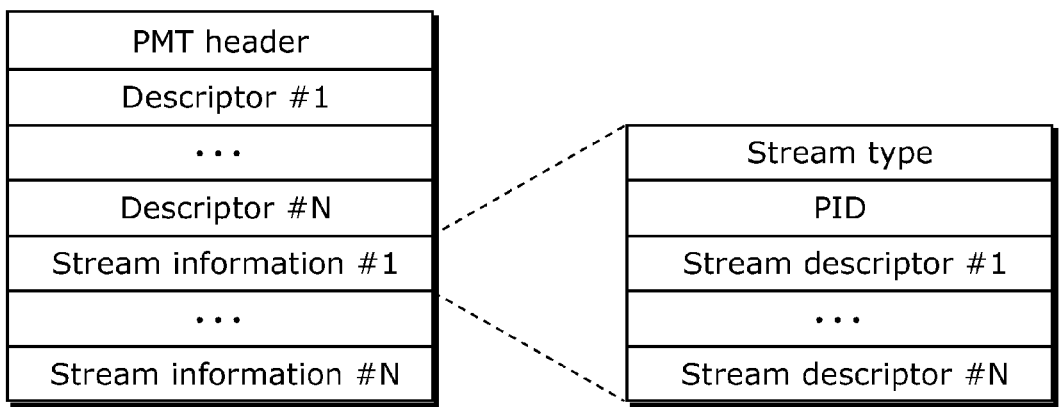
FIG. 24 is a diagram illustrating a data structure of a PMT.

FIG. 24 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 25:
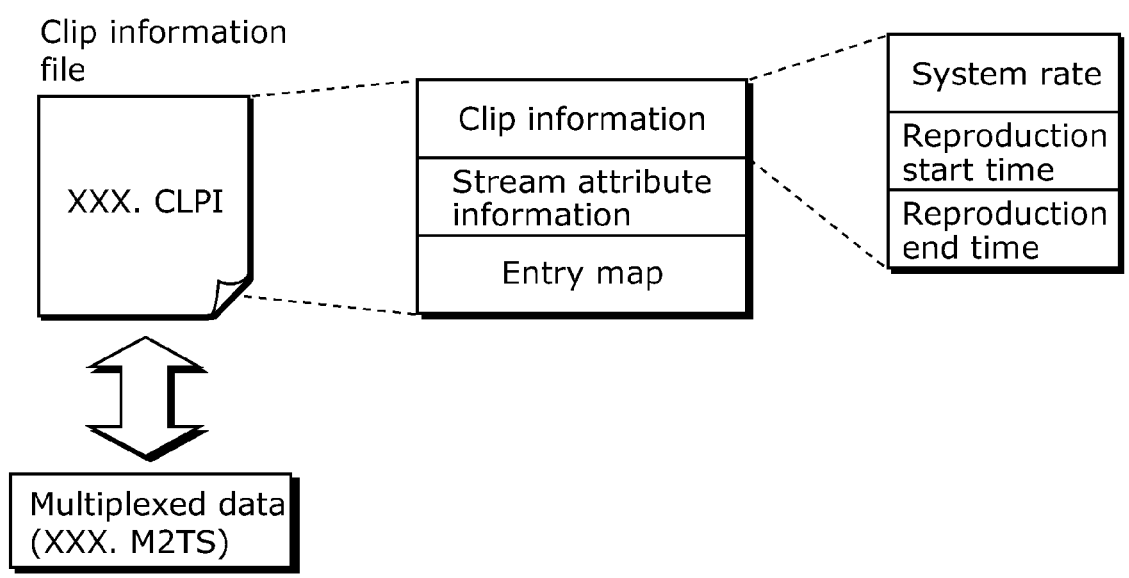
FIG. 25 is a diagram illustrating an internal structure of multiplexed data information.

Each of the multiplexed data information files is management information of the multiplexed data as shown in FIG. 25. The multiplexed data information files are in one to one correspondence with the multiplexed data, and each of the files includes multiplexed data information, stream attribute information, and an entry map.

As illustrated in FIG. 25, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 26:
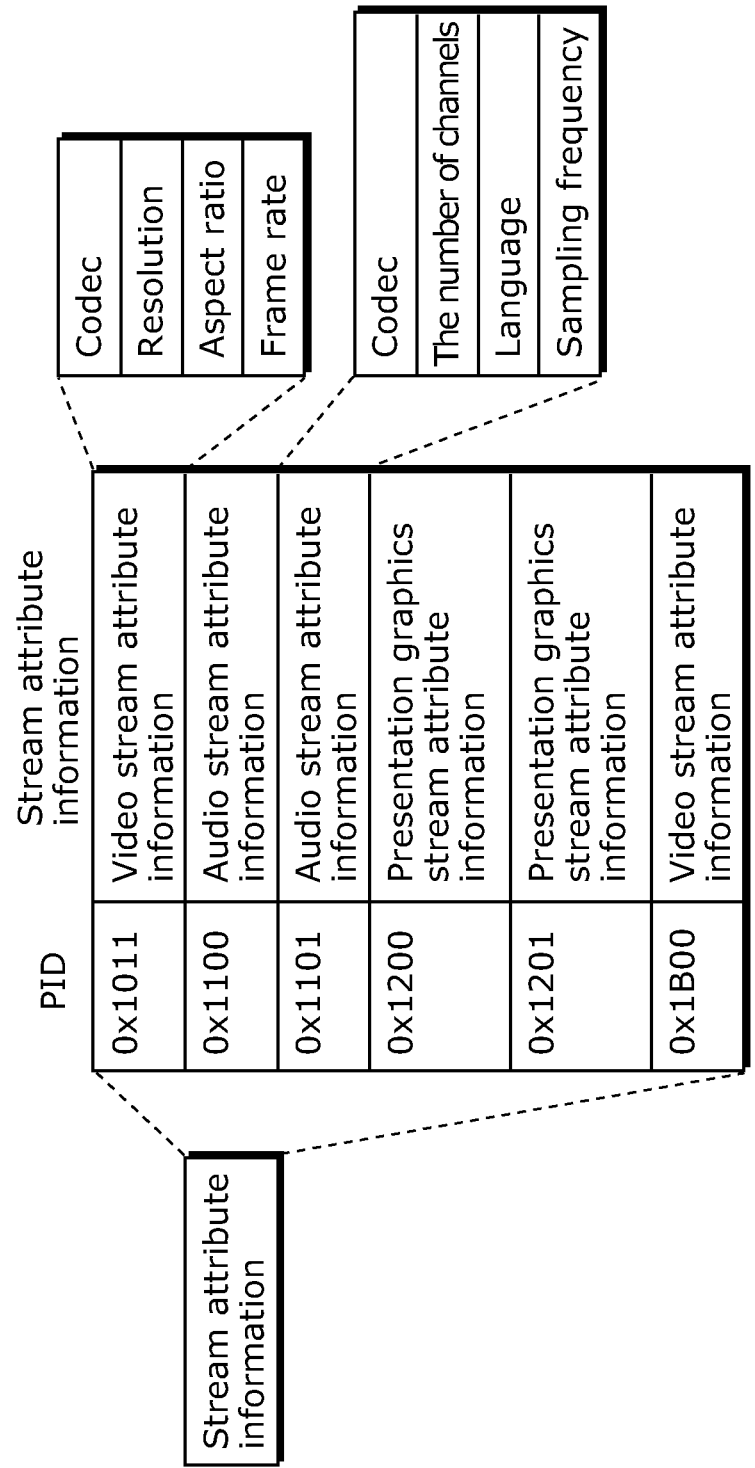
FIG. 26 is a diagram illustrating an internal structure of stream attribute information.

As shown in FIG. 26, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 27:
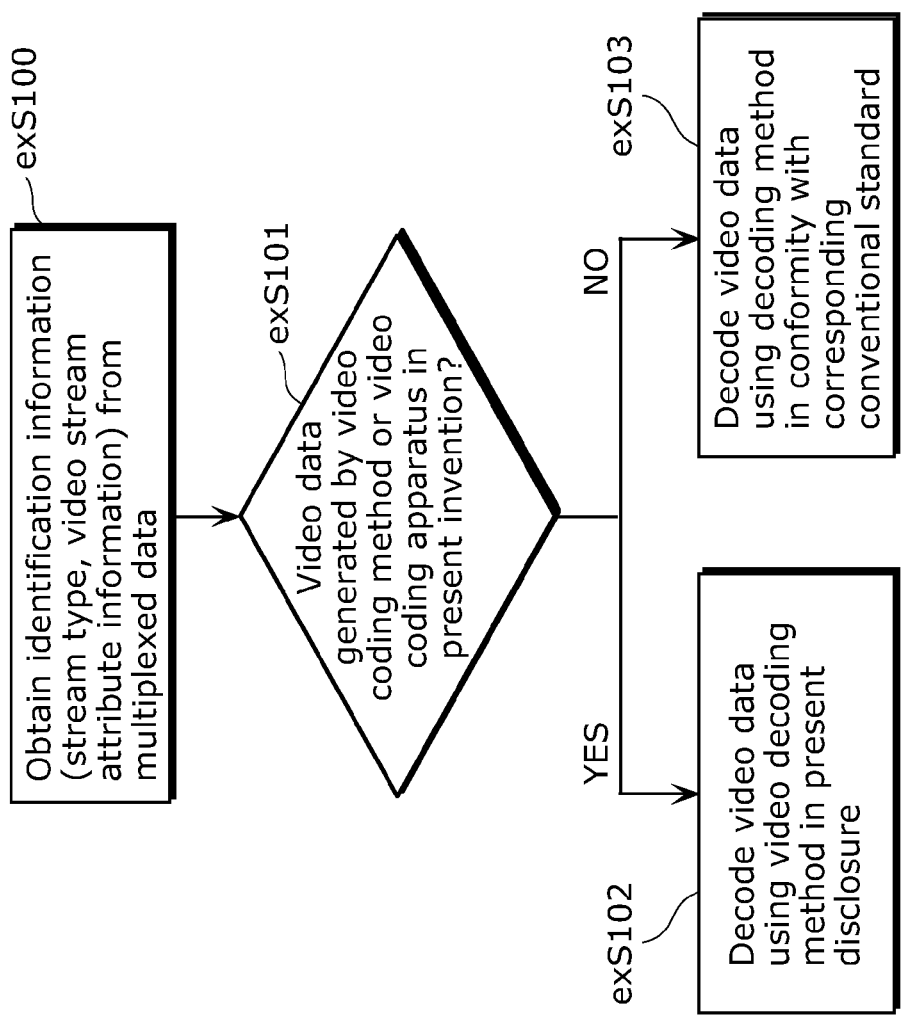
FIG. 27 is a diagram illustrating steps for identifying video data.

Furthermore, FIG. 27 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 28:
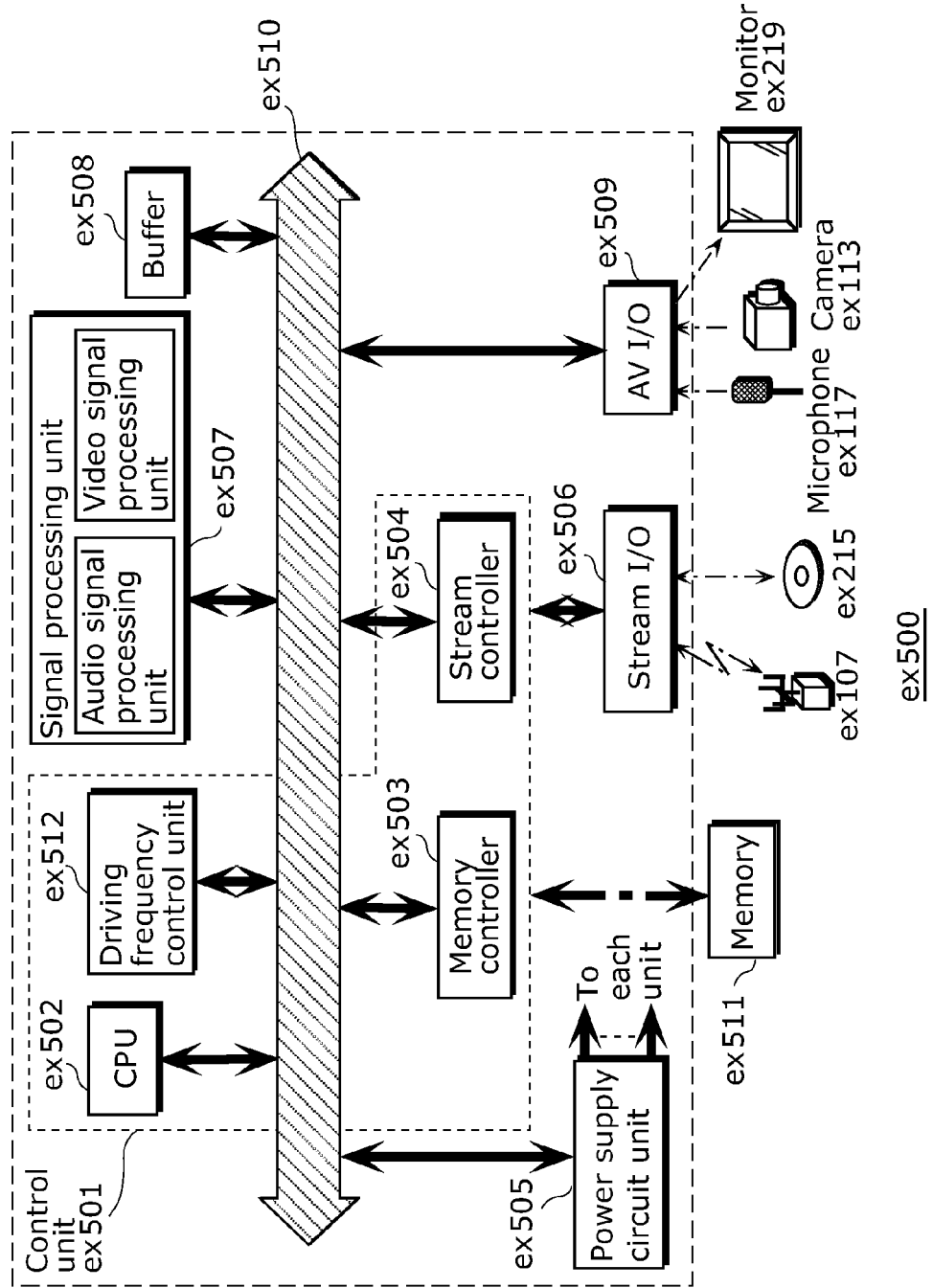
FIG. 28 is a block diagram illustrating an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 28 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 29:
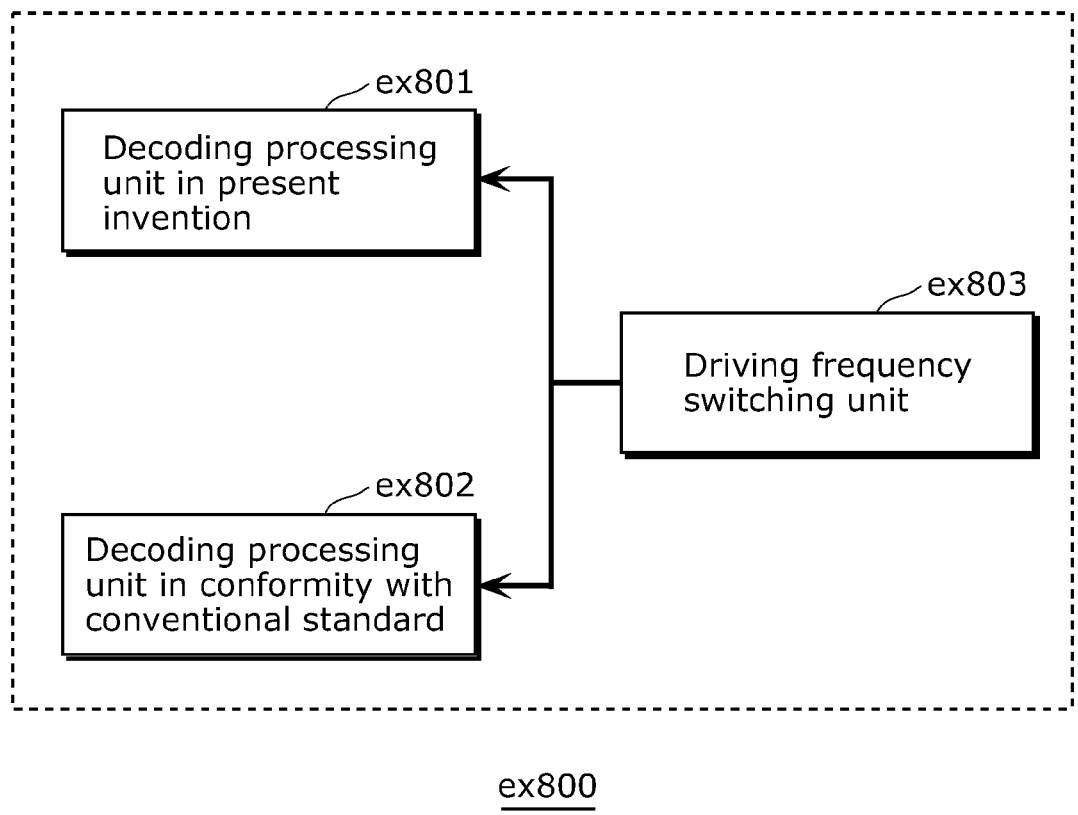
FIG. 29 is a diagram illustrating a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 29 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 28. Here, each of the decoding processing unit ex801 that executes the moving picture decoding method described in each of embodiments and the decoding processing unit ex802 that conforms to the conventional standard corresponds to the signal processing unit ex507 in FIG. 28. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 4 is used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 31. The driving frequency can be selected by storing the look-up table in the buffer ex508 and in an internal memory of an LSI, and with reference to the look-up table by the CPU ex502.

Figure 30:
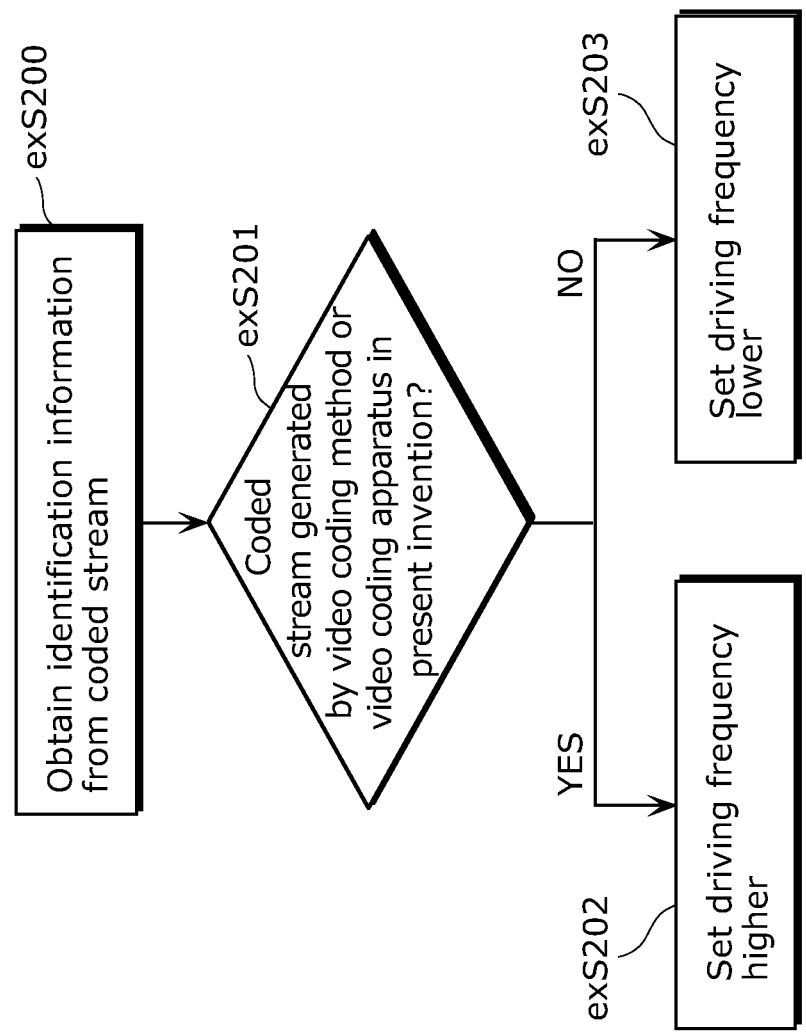
FIG. 30 is a diagram illustrating steps for identifying video data and switching between driving frequencies.

FIG. 30 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 32A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present invention and does not conform to MPEG-4 AVC. In particular, since the aspect of the present invention is characterized by error judgment processing, it is possible, for example, for the dedicated decoding processing unit ex901 to be used for error judgment processing, and for the decoding processing unit to be shared by any or all of the other processing, such as inverse quantization, entropy decoding, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 32B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable to image decoding methods and image decoding apparatuses. Furthermore, the present invention can be used in high-resolution information display devices or image-capturing devices which include an image coding apparatus, such as a television, a digital video recorder, car navigation system, a cellular phone, a digital camera, a digital video camera, and so on.

The invention claimed is:

1. An image decoding method for decoding a bitstream, the image decoding method comprising:
    extracting a size of an image from the bitstream;
    extracting a size of a smallest coding unit from the bitstream;
    judging whether or not the size of the image is an integral multiple of the size of the smallest coding unit;
    decoding a coded image signal included in the bitstream, using the size of the image, when the size of the image is an integral multiple of the size of the smallest coding unit, to generate a first decoded image; and
    determining that an error is included in the bitstream when the size of the image is not an integral multiple of the size of the smallest coding unit,
    wherein the determining includes decoding the coded image signal included in the bitstream, using an assumed size of the image, to generate a second decoded image, the assumed size being obtained under an assumption that a correct size of the image is an integral multiple of the size of the smallest coding unit.

2. The image decoding method according to claim 1, wherein the determining includes:
    calculating the number of padding rows or the number of padding columns, based on a difference between the extracted size of the image and the assumed size of the image; and
    cropping, from the second decoded image, an image having the number of the padding rows or the number of the padding columns.

3. The image decoding method according to claim 2, further comprising
    extracting padding direction information from the bitstream, the padding direction information indicating one of top, bottom, left, and right sides of the image,
    wherein, in the cropping, the image having the number of the padding rows or the number of the padding columns is cropped from the second decoded image at any one of the top, bottom, left, and right sides indicated by the padding direction information.

4. The image decoding method according to claim 3, wherein, in the extracting of padding direction information, the padding direction information is extracted from a picture-specific parameter set or a sequence-specific parameter set which are included in the bitstream.

5. An image decoding apparatus that decodes a bitstream, the image decoding apparatus comprising:
    a parsing unit configured to extract, from the bitstream, a size of an image and a size of a smallest coding unit;
    a judgment unit configured to judge whether or not the size of the image is an integral multiple of the size of the smallest coding unit;
    an image decoding unit configured to decode a coded image signal included in the bitstream, using the size of the image, when the size of the image is an integral multiple of the size of the smallest coding unit, to generate a first decoded image; and
    a determining unit configured to determine that an error is included in the bitstream when the size of the image is not an integral multiple of the size of the smallest coding unit,
    wherein the determining unit is configured to decode the coded image signal included in the bitstream, using an assumed size of the image, to generate a second decoded image, the assumed size being obtained under an assumption that a correct size of the image is an integral multiple of the size of the smallest coding unit.

6. An image coding and decoding apparatus comprising:
    an image coding apparatus comprising:
        an image size calculation unit configured to calculate, as a size of an image, the number of pixels which is an integral multiple of a size of a smallest coding unit; and
        a bitstream generation unit configured to generate a bitstream including the size of the smallest coding unit and the size of the image; and
    an image decoding apparatus comprising:
        a parsing unit configured to extract, from the bitstream, the size of the image and the size of the smallest coding unit;
        a judgment unit configured to judge whether or not the size of the image is an integral multiple of the size of the smallest coding unit;
        an image decoding unit configured to decode a coded image signal included in the bitstream, using the size of the image, when the size of the image is an integral multiple of the size of the smallest coding unit, to generate a first decoded image; and
        a determining unit configured to determine that an error is included in the bitstream when the size of the image is not an integral multiple of the size of the smallest coding unit,
        wherein the determining unit is configured to decode the coded image signal included in the bitstream, using an assumed size of the image, to generate a second decoded image, the assumed size being obtained under an assumption that a correct size of the image is an integral multiple of the size of the smallest coding unit.

7. A non-transitory computer-readable recording medium having recorded thereon a program which, when executed, causes a computer to execute the image decoding method according to claim 1.

8. An integrated circuit that decodes a bitstream, the integrated circuit comprising:
    a parsing unit configured to extract, from the bitstream, a size of an image and a size of a smallest coding unit;
    a judgment unit configured to judge whether or not the size of the image is an integral multiple of the size of the smallest coding unit;
    an image decoding unit configured to decode a coded image signal included in the bitstream, using the size of the image, when the size of the image is an integral multiple of the size of the smallest coding unit, to generate a first decoded image; and a determining unit configured to determine that an error is included in the bitstream when the size of the image is not an integral multiple of the size of the smallest coding unit, wherein the determining unit is configured to decode the coded image signal included in the bitstream, using an assumed size of the image, to generate a second decoded image, the assumed size being obtained under an assumption that a correct size of the image is an integral multiple of the size of the smallest coding unit.

* * * * *